US007191237B2

(12) United States Patent
Jodra et al.

(10) Patent No.: US 7,191,237 B2
(45) Date of Patent: Mar. 13, 2007

(54) AUTOMATIC REGISTRATION OF RECEIVING DEVICE ON A REMOTE PRINTING APPLICATION

(75) Inventors: Rodolfo Jodra, Boise, ID (US); Luca Chiarabini, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 764 days.

(21) Appl. No.: 10/271,519

(22) Filed: Oct. 15, 2002

(65) Prior Publication Data

US 2004/0073684 A1 Apr. 15, 2004

(51) Int. Cl.
*G06F 15/16* (2006.01)

(52) U.S. Cl. ...................................... 709/228; 709/206
(58) Field of Classification Search ................ 709/203, 709/206
See application file for complete search history.

(56) References Cited

U.S. PATENT DOCUMENTS

| 5,819,015 | A  | * | 10/1998 | Martin et al. .............. 358/1.15 |
| 6,687,018 | B1 | * | 2/2004  | Leong et al. .............. 358/1.15 |
| 6,993,562 | B2 | * | 1/2006  | Treptow et al. ............. 709/206 |
| 2002/0042884 | A1 | * | 4/2002 | Wu et al. ................... 713/201 |
| 2002/0048036 | A1 | * | 4/2002 | Nakagawa et al. ........ 358/1.14 |
| 2002/0059489 | A1 | * | 5/2002 | Davis et al. ................... 710/72 |
| 2003/0023695 | A1 | * | 1/2003 | Kobata et al. ............. 709/206 |
| 2003/0078965 | A1 | * | 4/2003 | Cocotis et al. ............. 709/203 |
| 2003/0182378 | A1 | * | 9/2003 | Treptow et al. ............. 709/206 |
| 2004/0001217 | A1 | * | 1/2004 | Wu .......................... 358/1.15 |

* cited by examiner

*Primary Examiner*—Jason Cardone
*Assistant Examiner*—Minh-Chau N. Nguyen
(74) *Attorney, Agent, or Firm*—Peter I. Lippman

(57) ABSTRACT

A system and service for delivery of files to a plurality of users over a communications network comprises one or more server computers operable for receiving a plurality of electronic documents or files and storing those document/files; a plurality of receiving devices capable of receiving the documents/files; and a plurality of printer devices for printing the documents/files. Each receiving device registers itself with a server computer, and for each individual user, a printer device is specified for printing documents/files intended for that user. The server computer distributes the documents for a particular user to the corresponding receiving device specified by that user for receiving those documents/files, and the documents/files are printed on the specified printer device.

18 Claims, 24 Drawing Sheets

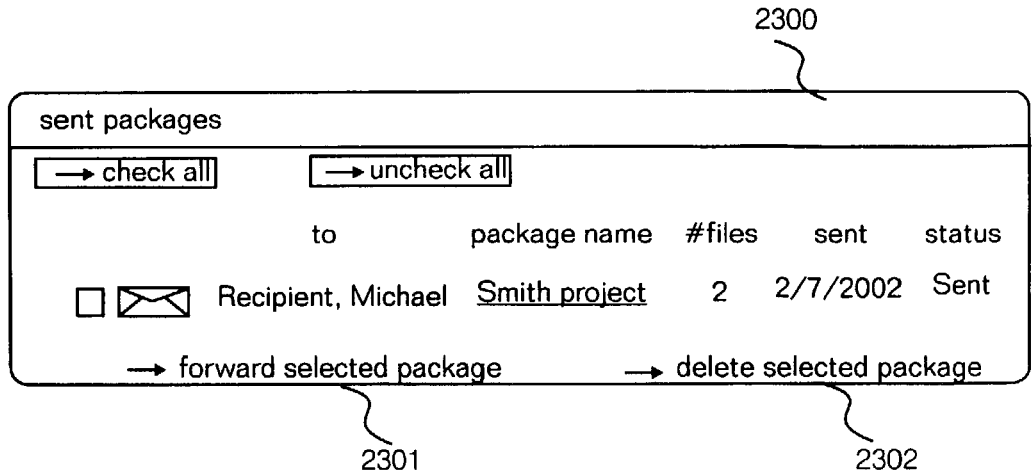

Fig. 23

| | | | | |
|---|---|---|---|---|
| 2400 → | Date: | Fri, 7 Feb 2002 04:20 PM (PST) | | |
| 2401 → | From: | remote-printing@hp.com | | |
| 2402 → | To: | jim-sender@yahoo.com | | |
| 2403 → | Subject: | File sent to printer from package Smith project | | |

Your file 1st floor architectural Architectural Plan (1) has been sent to the receiver's printer.

You can check the status of your packages here:
2404 → https://h30003.www3.hp.com/techprint/tibisentkgs.jsp 2405 → Package Details:

From:　　　　jim_sender@yahoo.com
To:　　　　　mailto:n michael ecipient@yahoo.com
Date:　　　　2002-02-07 04:20
Subject:　　　Modified plans
Package Name: Smith project
Package identifier:　12088

2406 → File Identifier　　File Name
----------------------------------------
　　12583　　　　　1st floor architectural Architectural Plan (1)

Fig. 24

2500 → Date: Fri, 7 Feb 2002 04:20 PM (PST)
2501 → From: remote-printing@hp.com
2502 → To: micheal-recipient@yahoo.com
2503 → Subject: New Package: Smith project You have received a new package from jim_sender@yahoo.com You may accept or delete this package here:
https://h30003.www3.hp.com/techprint/tibiinbox.jsp 2504 → Package Details:

From: mailto:jim_sender@yahoo.com
To: michael_recipient@yahoo.com
Date: 2002-02-07 04:20
Subject: Modified plans
Package Name: Smith project
Package identifier: 12088

2505 → File Identifier      File Name
-----------------------------------------------------------
       12583              1st floor architectural Architectural Plan (1)
       12584              1st floor electrical Electrical Plan (1)

Fig. 25 package details from: Sender, Jim    received: Thu 02/07/2002/03:13 PM, PST — 2802
                    expires:  Thu 03/07/2002 03:13 PM, PST — 2803

2801 package name: Smith project — 2804
subject: Modified plans — 2805
message:
Hi, Michael
Please, review the last changes. — 2806
Regards,
Jim package ID: 12088 — 2807

→ check all     → uncheck all

2809
| file ID | file name | file size | print size | status | thumbnail |
|---|---|---|---|---|---|
| ☐ 12583 | 1st floor architectural Architectural Plan (1) | 669K | 24 x 36" | Opened |  |
| ☐ 12584 | 1st floor electrical Electrical Plan (1) | 1164K | 24 x 36" | Opened |  |

2808 number of copies: [1] — 2810

→ print selected files        → delete this package
  2811                          2812
→ forward selected files      → done
  2813                          2814

Fig. 28

AUTOMATIC REGISTRATION OF RECEIVING DEVICE ON A REMOTE PRINTING APPLICATION

FIELD OF THE INVENTION

The present invention relates to a system for delivering files to a plurality of users over a communications network.

BACKGROUND TO THE INVENTION

In a known implementation of a remote printing application, a user enters into a receiving device the names of one or more users who wish to receive documents. The limitations of this prior art approach include the following.

Firstly, the receiving device needs to store the names of all users who wish to receive documents.

Secondly, the receiving device needs to have an ability to validate users. Conventional receiving devices can be defeated by someone impersonating another user by entering the name of that other user into the receiving device. User authentication information is very sensitive, and distributing it across a plurality of different devices is risky.

Thirdly, when a user wishes to direct documents to a different receiving device, she must remove her name from the old receiving device and add her name to the new receiving device. Having two devices receiving prints for the same user makes system behavior unpredictable.

In another prior art implementation, a name is assigned to a receiving device. For example a phone number may be assigned to a receiving device as the name. A user specifies in a server computer an identifier of the receiving device, which will handle the documents. This implementation has some implications as follows:

Firstly, a separate administrator must provide a unique identifier to the receiving device.

Secondly, a user must find out the identifier of the receiving device and provide it to the server.

Specific implementations according to the present invention aim to provide a remote printing service, method and apparatus, which avoids some of the problems as described above with prior art printing applications.

SUMMARY OF THE INVENTION

According to one aspect of the present invention there is provided a system for delivering files to a plurality of users over a communications network, said system comprising:
 at least one server computer, said server computer operable for receiving a plurality of electronic documents, and storing said plurality of electronic documents;
 a plurality of receiving devices capable of receiving said documents; and
 a plurality of printer devices capable of printing said documents,
  wherein:
 each said receiving device has assigned to it at least one said printer device;
 each said receiving device is registered with said server computer, said receiving device being identified by a unique identifier data stored by said server computer;
 said server computer allocates documents for a particular individual receiver user to a receiving device registered with the server computer for said particular receiver user; and
 said server computer sends said documents to a said receiving device upon receipt of a request data received by said server computer from said receiving device.

Further aspects of the invention are as recited in the claims herein, and the scope of the invention shall be taken as being limited only by the features of the claims.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which:

FIG. 23 illustrates schematically a tracking interface display screen viewable by a sender computer by a web browser, and generated by a server computer hosting a remote printing service, for tracking packages sent by a sending computer;

FIG. 24 illustrates schematically an e-mail generated by a server computer and sent to a sending computer, confirming that a file from a package has been sent to a printer;

FIG. 25 illustrates schematically an example of a second e-mail generated by the server computer and sent to a receiving device, notifying a user operating the receiving device that a package is awaiting collection at the remote printing service;

FIG. 28 illustrates schematically a display interface screen listing details of packages awaiting collection at a remote printing service hosted by a remote server.

DETAILED DESCRIPTION OF THE BEST MODE FOR CARRYING OUT THE INVENTION

Figure 1:
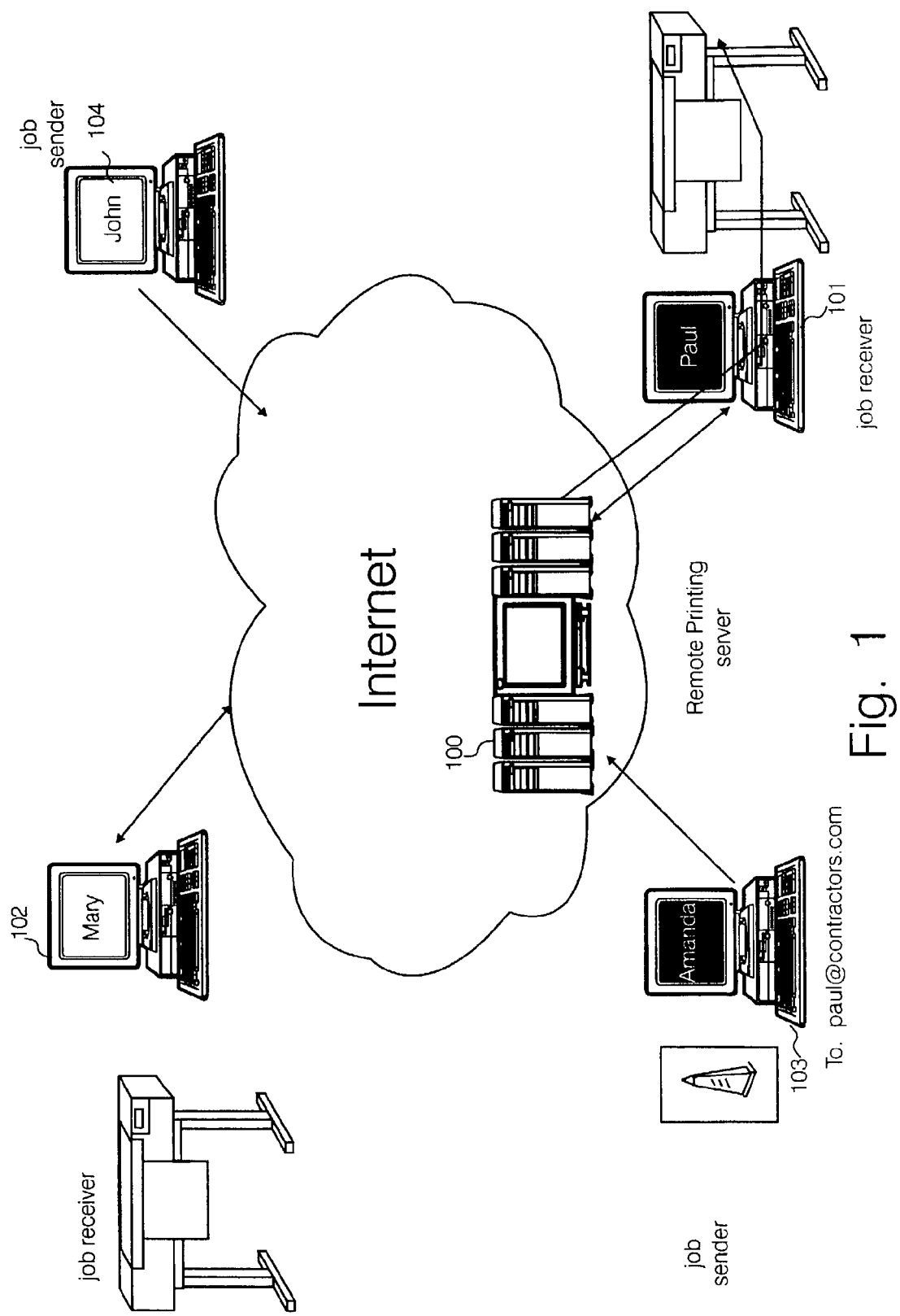
FIG. 1 illustrates schematically in overview a document collection, distribution and printing system, providing a document collection, distribution and printing service to a plurality of users.

There will now be described by way of example the best mode contemplated by the inventors for carrying out the invention. In the following description numerous specific details are set forth in order to provide a thorough understanding of the present invention. It will be apparent however, to one skilled in the art, that the present invention may be practiced without limitation to these specific details. In other instances, well known methods and structures have not been described in detail so as not to unnecessarily obscure the present invention.

In this specification, the following terms have the following meanings:

The term 'server computer', is used, to mean a computer entity which is capable of providing a service to one or more computer entities. The terms 'remote server computer', and 'remote printing server' are used to mean the same thing as a server computer.

The term 'receiving device' is used, to mean a device capable of receiving a job, and equivalent terms of 'e-receiver' is used to mean the same thing.

The term 'sender computer' is used, to mean a device capable of sending a job, and the term 'e-sender' is used to mean the same thing.

The term 'job sender' is used to mean a human individual who sends one or more documents comprising a print job to be printed.

The term 'job receiver' describes a human individual acting to receive one or more print documents or print jobs.

The term 'a user' is used to mean a human individual, using a printing service.

The term 'print job' is used to describe one or a plurality of electronic documents, which are sent from a job sender to a job receiver, for printing at a receiving device.

The Job sender and job receiver are each users of a printing system, and an individual user may act as either a job sender or a job receiver independently, or as a job sender and a job receiver at the same time.

In various implementations according to the present invention, there is provided a method for remote delivery of files over a communications network, said method comprising registering a plurality of user accounts, each user account correspond to a respective user. Each user account comprises a user identifer, identifying a said user; a receiving device identifier, identifying a receiving device to which documents are to be sent for said user account and a printer identifier data for identifying one or more printer devices. The method comprises; for each user account, registering at least one printer device for printing of document allocated to said user account; receiving and storing a plurality of documents intended for one or more said users; associating said plurality of documents with corresponding said user accounts; delivering said documents over a communications network to at least one receiving device; storing at least one receiving device identifiers, each identifying a corresponding respective receiving device; and routing individual documents intended for individual said users to at least one corresponding receiving devices for printing at specified printer devices registered to said user account.

In the user account, the printer device identifier is needed in the best mode implementation, but in the general case, is not essential.

Other embodiments provide for a printing service comprising the features of registering a plurality of user accounts, each user account corresponding to a respective user, each said user account comprising; a user identifier identifying a user; a receiving device identifier, identifying a receiving device to which documents are to be sent to for said user account; for each user account, registering a printer device for printing of document allocated to said user account; receiving and storing a plurality of documents intended for one or more said users; associating said plurality of documents with corresponding said user accounts; delivering said documents over a communication network to a plurality of receiving devices; storing a plurality of said receiving device identifiers, each identifying a corresponding respective receiving device; and routing individual documents intended for individual said users to corresponding receiving devices for printing at specified printer devices registered to said user account.

Specific methods of the invention, can be implemented by way of an algorithm for implementing file storage at a server computer device, and file distribution to a plurality of receiving devices, said algorithm comprising modules for performing the steps of: maintaining a list of unique identifiers, each said unique identifier assigned to a corresponding respective receiving device; for each said receiving device, maintaining at least one user account; and assigning incoming documents intended for a specified user to a corresponding respective said user account.

Other specific methods can be carried out by a computer program for managing document transfer to a receiving device hosting said computer program, said program comprising components operable for; sending a command requesting an identifier data; receiving an identifier data identifying said receiving device; generating requests for download of files intended for said receiving device; specifying a printer device to which receiving files are to be sent or printing; and receiving said files and routing said files to a specified said printer device.

Yet further specific methods can be carried out by a computer program for managing storage and distribution of a plurality of documents files, in conjunction with a computer device comprising a processor, memory, a data storage device, and a communications port, said computer program comprising components operable for; receiving a request for registration of a receiving device; generating a unique identifier data for identifying a receiver device; receiving a user account data identifying a user; receiving a printer identifier data identifying a printer device to which individual documents intended for said user account are to be printed on; a database for storing a plurality of said user account data; a component for identifying documents intended for a said user, and associating said documents with a said user account; component for sending a command to a receiving device and printer device associated with a said user account, upon receipt of a command from a said receiving device.

A printing system comprising at least one server computer which acts to route documents intended for a plurality of users, at least one receiving device which acts to receive documents sent from said server computer; and at least one printer device associated with said receiving device, for printing said documents may operate by registration of a plurality of receiving devices at said server computer by creating a plurality of receiving device identifiers which identify said plurality of receiving devices, each said registration data specifying at least one said printer device for printing a document addressed to a user; receiving interrogations from said plurality of receiving devices, and said interrogations sending of documents intended for said receiving devices; in response to said interrogations, causing said server computer to identify one or more documents intended for said receiving devices; and sending said identified documents to said receiving device.

Further components may be provided for sending an e-mail to a sender registered with said at least one sever computer, said e-mail comprising a data field describing a package of at least one said document; a data field for containing information specifying that said package has been sent to a printer device. There may be provided components for sending an e-mail from said at least one server computer to a recipient for a job package, said e-mail comprising; a data field describing a package of one or more documents for printing; and a data field for containing information notifying a recipient that a new package has been received at said at least one server computer.

In some specific embodiments, a server computer comprising at least one data processing device; at least one data storage device; at least one communications interface; operates as web server said web server accepting documents for printing via said communication interface; generating a message indicating that a job is available for printing, and sending said message via said communications interface; receiving an acceptance message for accepting a job to be printed; responding to said acceptance message by sending said print job via said communications interface; generating a second message confirming that a job has been printed, and sending said second message via said communications interface.

One system comprises at least one server computer acting to route documents intended for a plurality of users; at least one receiving device which acts to receive documents sent from said server computer; at least one printer device associated with said receiving device for printing said documents. A specific method of operation of the system comprises: sending a job to said remote printing server, using a sender computer, said sender specifying an address of a job receiver for which the print job is intended; a job receiver receiving an e-mail notification requesting the job receiver to confirm whether or not the job receiver accepts the print job; accepting said print job; downloading said print job from said server computer to said receiving device; and printing said print job.

According to specific embodiments of the present invention, there is provided a system, apparatus and service for sending files to remote printers over a communications network, for example, the internet. The system comprises at least one central server computer having a software component for uploading files to the server computer, and software components installed at a plurality of receiving devices, which are connected to the printers, enabling the printers to receive files downloaded from the server computer to be printed at the printers.

Users of the system may adopt two different roles, either job sender or job receiver. Job senders are users who deliver print jobs to be remotely printed. One or more sender computers sends files to the remote sever computer, specifying the receiving device to which the files are to be sent for printing.

Job receivers are users who share their printing resources through a mail box managed by the server, so that other users can print documents on the printers of the job receivers. The same user can play the role of job sender or job receiver at different times using the same software package downloaded to their local computer.

All communications over the communications network, for example the internet are managed by the central server computer, which is in charge of receiving, processing, tracking and routing all print jobs.

Documents are sent to users acting as receivers. Receivers select which individual printer devices the files are to be printed on.

A receiver software component, when installed on a receiving device, for example a client computer having a printing facility, or for example a printer having a user interface, registers the receiving device with the server computer. Registration of the receiving device with the server, in the best mode embodiment, requires user intervention via a screen interface display. When a user wishes to select a printer device, the user invokes the receiver device software, which sends to the server computer a list of printer devices which are installed at that receiving device.

The server returns a URL to the receiving device. The receiving device opens a window on that URL, which is in the server. Within this window, the user at the receiving device can log in to a service provided by the server computer, by providing a password and user name. The service enables the user to select which printer they wish to use for printing a document. Once a user has specified a printer device, the server computer routes all documents for that user to the receiving device which is logged in, and to the specific printer which the user has specified.

In order to register with the server computer, the receiver software needs to connect with the server, and receive a unique identifier data. The server computer recognises the different receiver devices to which it has assigned different unique identities. The identifier data is generated by the server, and the server keeps a list of different identifiers, in a database, the identifiers each having corresponding receiving devices assigned to them. The server computer notifies the receiving device of its identifier, by sending a message to the receiving device over the communications network, for example, the internet. The receiver device also stores its identifer data locally, so that it is able to recognise documents and commands sent to it by the server.

In usage, periodically, the receiving device interrogates the server computer, to download files which are intended for the receiving device. Effectively, the server computer maintains an account, for each receiving device, acting as a mail box for documents intended for that receiving device. On interrogating the server computer periodically, the receiving device causes the server computer to send all files intended for the receiving device to that receiving device, and when the files arrive at the receiving device, they are routed to the pre-specified printer for printing. A request message sent from the receiving device to the server computer for obtaining files, includes the identifier of the receiving device.

On receipt of the request at the server computer, the server computer sends the files to that user's account to the receiving device corresponding to that user. The server computer has an internal algorithm which determines which files need to be sent to which receiving device. The server computer determines which files are assigned to the account of that particular user, and sends then to the receiving device specified for that user.

A remote printing service comprises two main sub-systems:

A large, number of receiving devices which perform printing of documents;

A server computer which keeps the documents and routes them to appropriate receiving devices.

The service is used by a plurality of sender computers. During registration as a sender user, a mailbox is created for each registered user, identified by an address.

Documents may be generated at a sender device 103, and a user may send a document to the printing service for printing at any of the receiving devices with which the user has requested. A plurality of sender devices 103, 104 may be present in the system.

Documents are addressed to users. Each user selects which receiving device will print the documents addressed to him.

Routing of the documents to the appropriate receiving device by the server is flexible enough to support the following use models:

A receiving device may print jobs intended for different users of the system.

A user may direct documents to several different receiving devices.

Specific implementations according to the present invention provide a method which allows a user to select which devices should print jobs. The method involves the receiving device getting a unique identifier data from the server computer.

A printing work flow to receive remotely sent jobs by a job sender comprises the following processes:

1. A job sender sends a job to the remote printing server using the e-sender. The job sender specifies the address of the job receiver for which the job is intended. The job sender receives an e-mail notification from the remote printing server acknowledging the uploading of the print job.

2. The job receiver receives an e-mail notification requesting the job receiver to confirm whether or not the job receiver accepts the print job.

3. The job receiver can accept the job directly from the e-mail, or can go to the remote printing server website, to inspect the contents of the job to be printed. At the website, the job receiver can accept the job or delete the job received. The job receiver can control whether or not she accepts or declines the print job.

4. If the job receiver accepts the print job, the e-receiver software downloads the job, renders it and sends it to the local printer that the job receiver has specified as his printer destination. The job receiver can order from the e-receiver user interface the immediate downloading of the job. This may be useful if for example, a print job task is urgent.

5. Once the job has been printed, an e-mail notification is sent to the job sender and to the job receiver.

The work flow allows the job receiver to decide exactly what she wants to print and when, i.e. either immediately or later. Also, the job receiver is advised by notification e-mail when she has a new job to accept, and the job sender is notified by e-mail when the printer has printed a print job.

Referring to FIG. 1 herein, there is illustrated schematically in overview, components of a printing system, for providing a service in which individual human users, can obtain delivery of printed documents from a print application resident at a centralised printing service, represented by one or more server computers 100 to a specified receiving device 101 which is registered with the server. A plurality of receiving devices 101, 102 may be present in the system.

Figure 2:
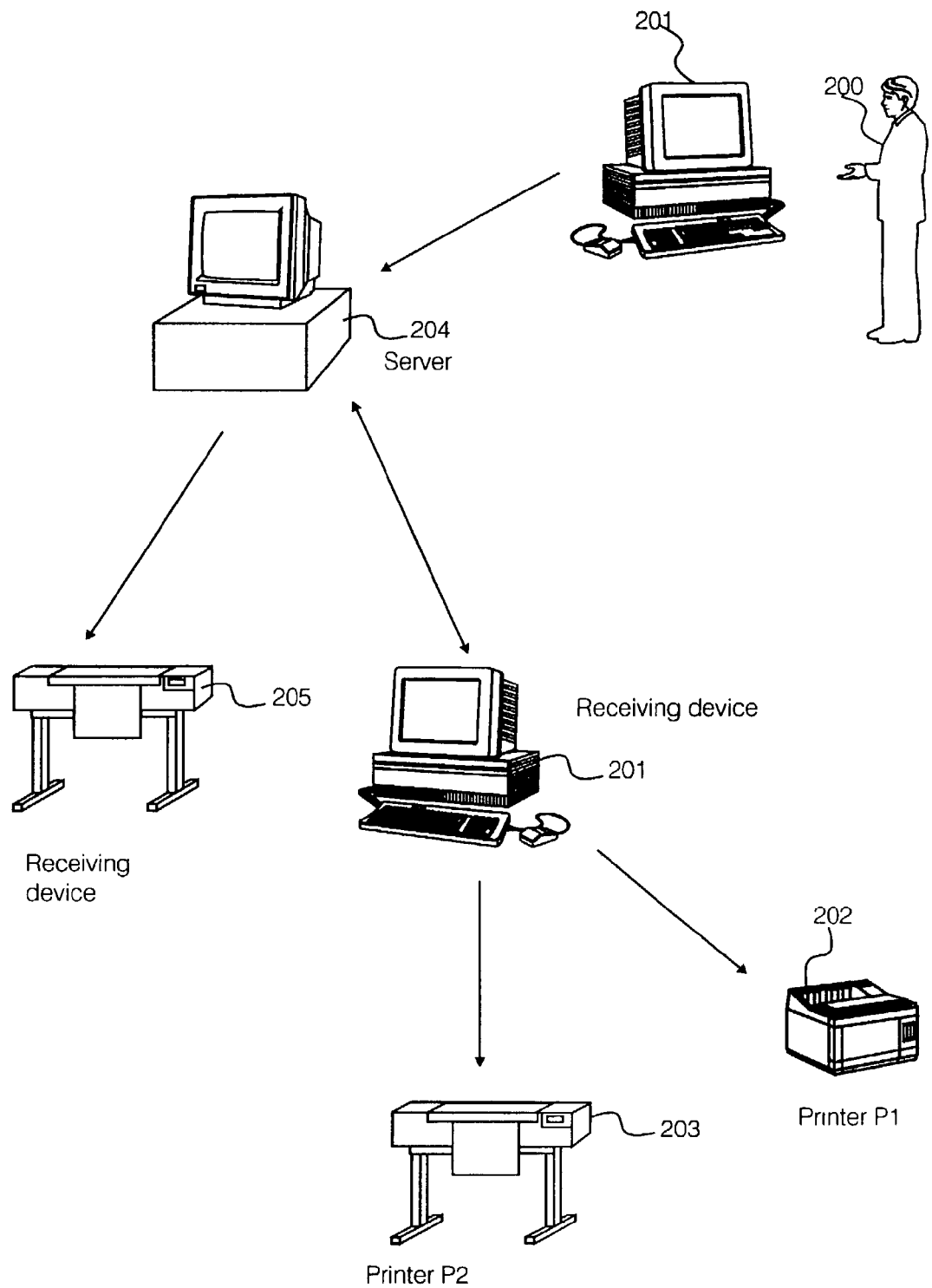
FIG. 2 illustrates schematically operation of the service for registration of a user for opening a user account.

Referring to FIG. 2 herein, there is illustrated schematically in overview, registration of a user account for a user 200 via a receiving device 201 having 1 or a plurality of associated printer devices 202, 203 respectively, with a distribution service provided by a remote print server computer 204.

A receiving device connects to a central service to obtain a unique identification data. The unique identification data need not be entered by any person using the system. In order to use the receiving device, a user gains access to it and asks to start a registration process. Then, the receiving device sends to a target server the unique identification data.

The server then operates to:

validate the user;

store a mapping between the user and the receiving device.

Afterwards, the receiving device gets documents from the server using only the unique identification data.

Advantages of this approach include the following:

A user does not need to know an identifier of the receiving device. The user only needs to gain access to the receiving device.

The receiving device does not keep any user information. All the information, including validation data, resides in the server. It is possible that the receiving device collects information from the user before sending it to the server, in some individual implementations.

If the user registers on another receiving device, the server will manage multiple registrations of that user on that other receiving device, for example by keeping only one registration per user.

In a best mode implementation for remote printing, a receiving device, which is a computer connected to the internet, transfers user information to a server through a web browser. The user enters her name and a password on the web browser window.

Figure 3:
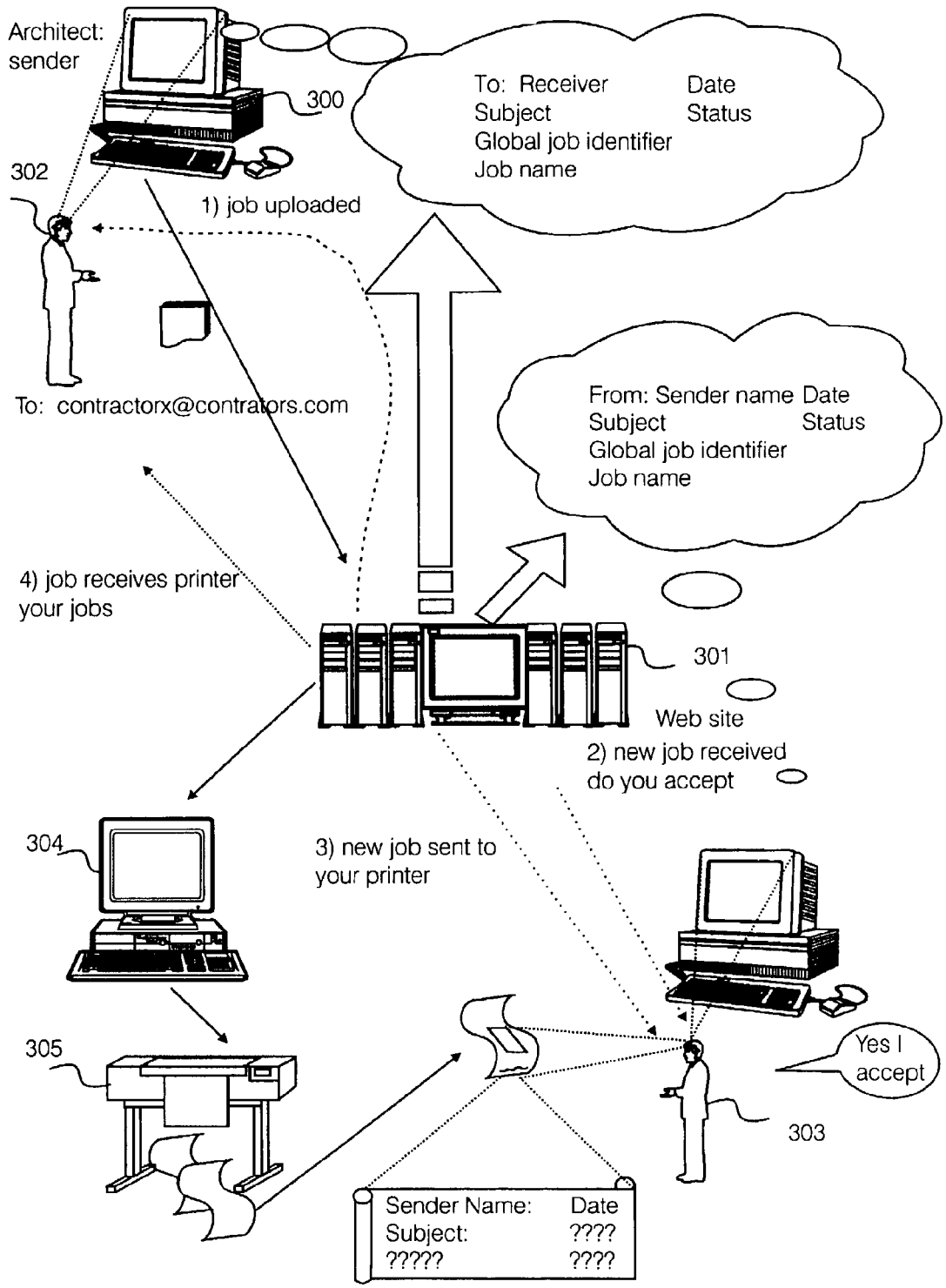
FIG. 3 illustrates schematically operation of the service for distribution of documents intended for a user, to a receiving device and a printing device specified by said user.

Referring to FIG. 3 herein, there is illustration schematically distribution and delivery of documents to a recipient device by a server computer, for printing at a printer device specified by a user.

A job is uploaded from an originating sender computer 300 to a remote printing server 301. The sending user 302 specifies a receiver name, subject of the print job, and a job name.

The server assigns a date, a status of the print job and a global identifier.

The remote printing server 301 notifies a receiving person 303 that a new job has been received. The remote printing server sends a notification that a job has been received to a receiving computer 304 specified by the receiving user. The receiving computer 304 is registered with the remote printing server 301. The receiving user 303 receives the message sent to a specified e-mail address.

The receiving user 303 can view the sender name, date, the job has been sent, subject matter, status of a job, a global identifier and a job name. This information is viewed by the receiving user on a web page displayed by the remote printing server, viewable by a web browser on a computer device operating by the receiving user.

Having accepted the job, the remote printing server sends the print job the receiving device 304, which prints the job on a specified printer device 305.

Once the job has been printed, the remote printing server sends an e-mail confirmation to the sender, confirming that a job has been printed.

Figure 4:
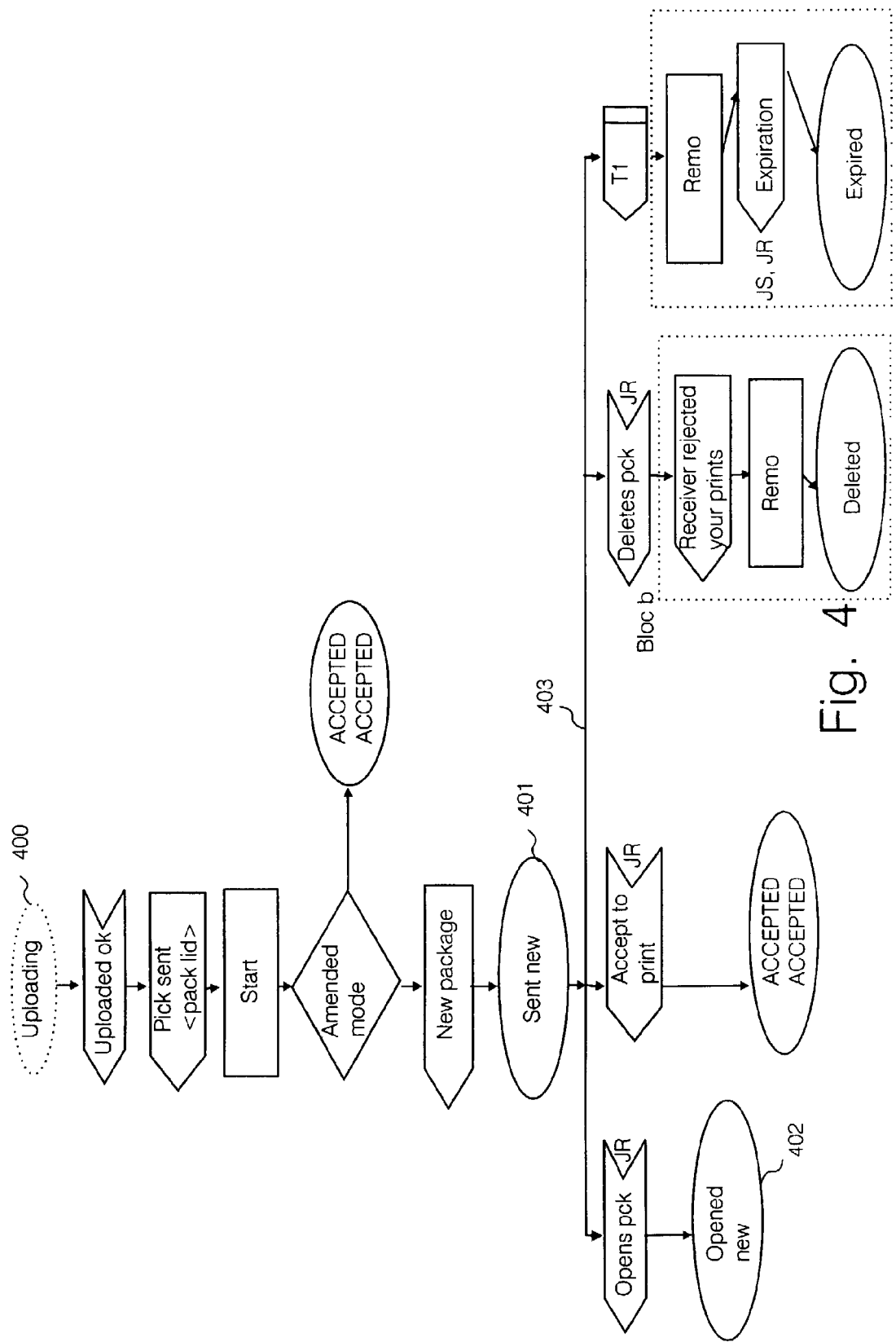
FIG. 4 illustrates schematically a state diagram of the system of FIG. 1.
Figure 5:
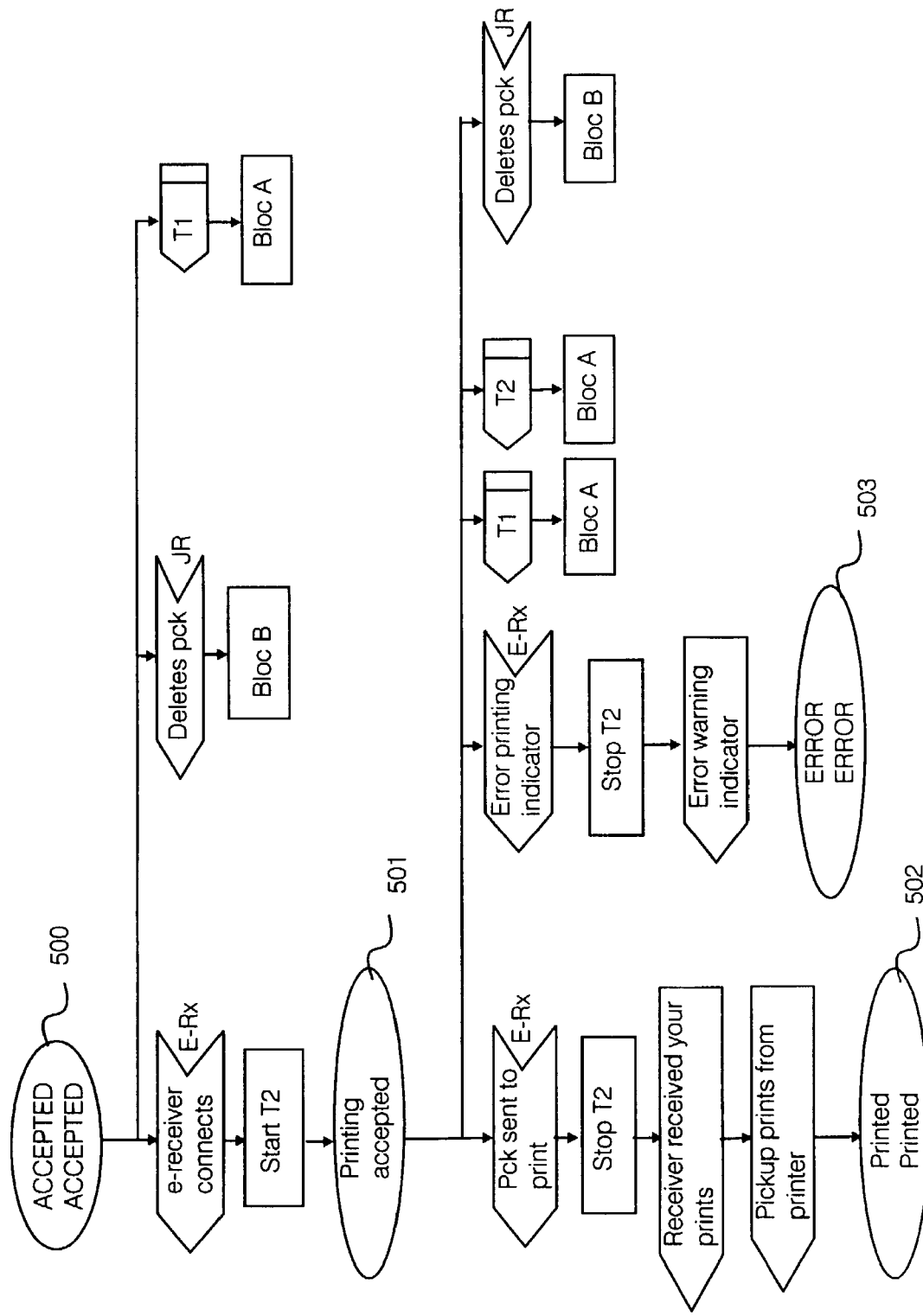
FIG. 5 illustrates schematically further aspects of the state diagram of the system of FIG. 1.

Referring to FIGS. 4 and 5 herein, there is illustrated schematically a state diagram illustrating various states which the printing system may adopt as between a remote printing server and a sending computer.

An uploading state 400 is not a real 'user' state, but is shown for illustrative purposes only. Users will get directly to a status SEND/NEW.

In a sent status 401 a new package has been sent to the receiving user. In the 'sent' status, the package has not yet been printed.

A receiver may open a package creating an OPEN status 402 when a receiver opens a package, in the open status the possible events are the same as in the sent status, except for an open action. The possible events include:
Accept the job for printing
The job expires
The job package is deleted
Subsequent actions are exactly the same as in the sent status.

If the job receiver deletes the package, it means that a status line 403 regarding that package disappears. This means for the job receiver, the status becomes NOT APPLICABLE. No other actions are available for the job receiver.

Once a job falls in the EXPIRED status, the job receiver can only perform a 'delete' option.

Referring to FIG. 5 herein, in the ACCEPTED state 500, the system can move to a printing state 501 in which a job is printed, following onto a PRINTED state 502 in which a job has completed being printed, or to an error state 503 in which a printing error occurs. Once in the printing state 501 a first Time 1 is the total time is stored at the remote printing server. A second Time 2 is the time which the job is stored without notice from the e-receiver.

In the ERROR state, the job is in a state like the SENT state but an error status is shown. This means that the job receiver has to accept explicitly that the job package again from the remote printing server. It is presumed that the job receiver will solve the problem of erroneous printing and will accept the package again. Problems which could occur include clipping problems, connection problems, or internet problems.

In the printed states 502 possible actions include:
Printed: This means to 'accept to print' (re-print the job again) this status and actions as that coming from the ACCEPTED status, but showing the status PRINTED for the job sender. The notification receiver received your prints to the job sender may not be needed
Delete: The status for the job sender will continue to be 'printed' for the job receiver the state is NOT APPLICABLE
Open: If the package has not been opened.

Figure 6:
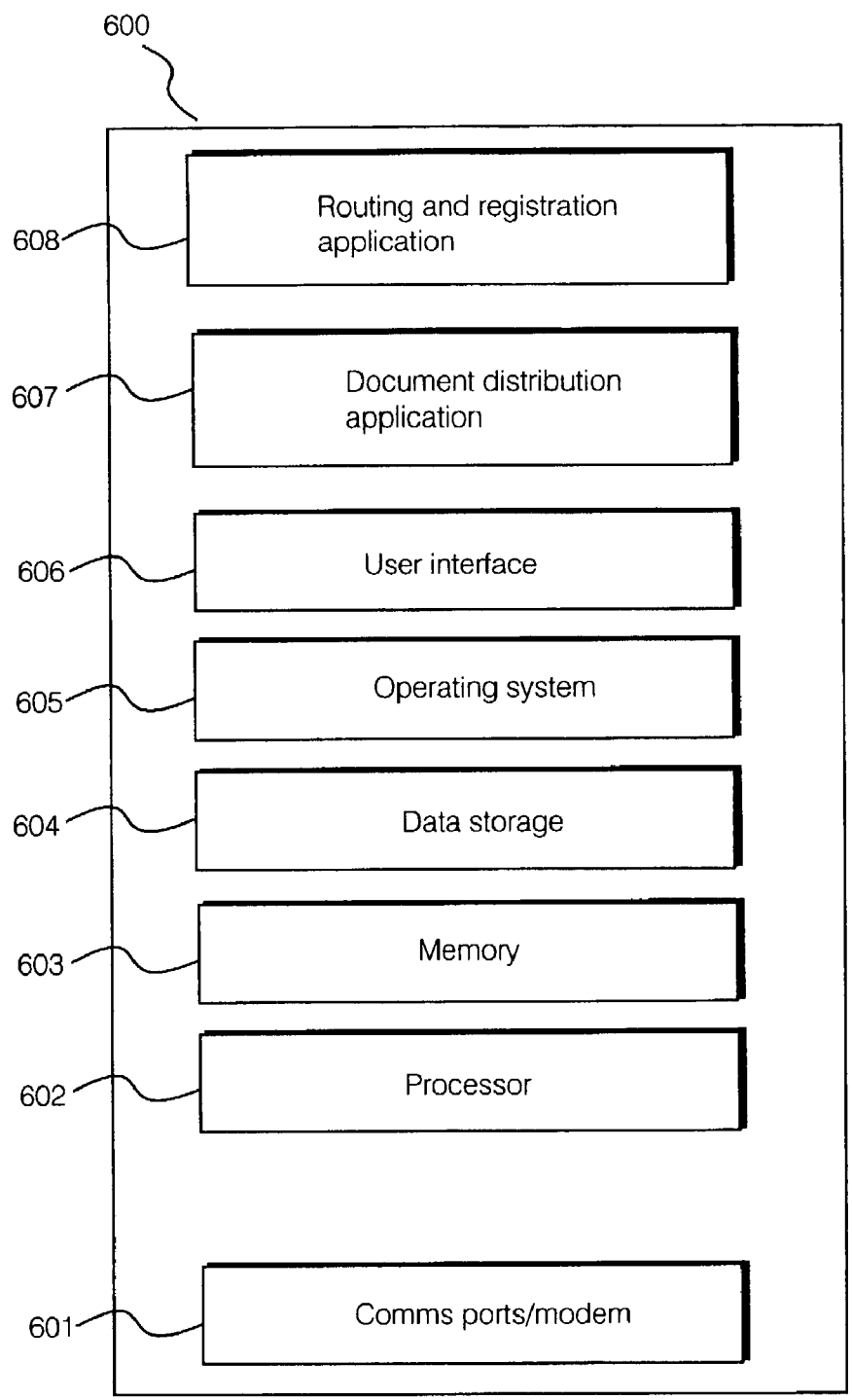
FIG. 6. illustrates schematically components of a server computer providing the document distribution service.

Referring to FIG. 6 herein, there is illustrated schematically a server device, supporting an automatic registration service to a plurality of users, for automatic registration of receiving devices to users, and for routing of documents and print jobs to receiving devices specified by individual users. The server device comprises a case in, power supply, and a set of internal cards as is known in the art, and includes a communications port/modem 601; one or more processors 602; an area of memory 603; one or more data storage devices 604, for example a hard disk or the like; an operating system 605, for example Microsoft Windows®, Unix®, or Linux®; a user interface 606, typically comprising a video monitor, or LCD monitor, pointing device such as a mouse, and a keyboard; a remote printing application 607; and a routing and registration application 608 for registering users and receiving devices, storing a mapping between a user and the receiving device, storing documents, and routing documents to receiving devices according to a user requesting that document.

Figure 7:
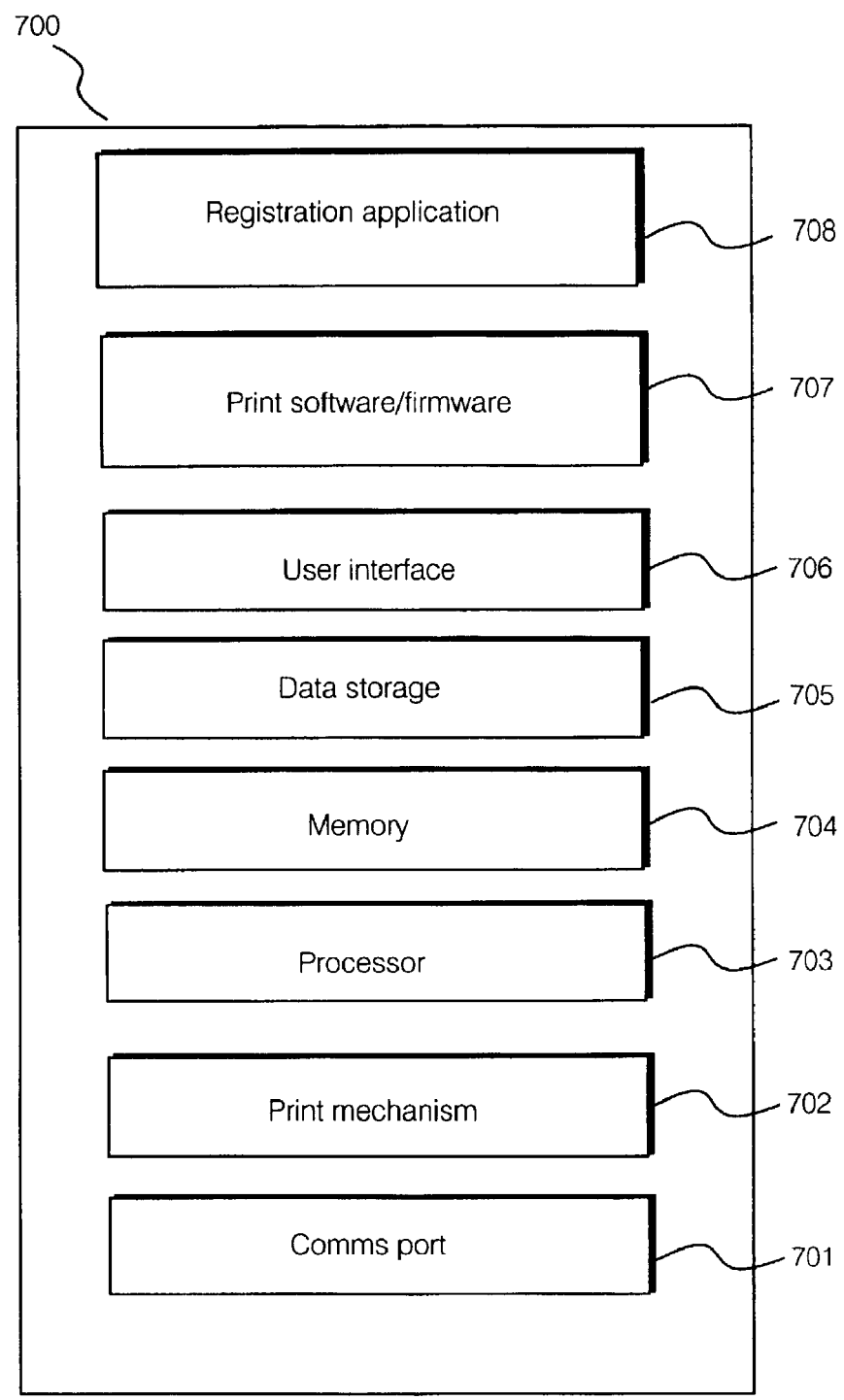
FIG. 7 illustrates schematically components of a receiving device for providing the document distribution service.

FIG. 7 illustrates schematically components of a receiving device, which may be present in either embodiment, that is, in the first receiving device embodiment comprising a computer plus associated printer, or in the second embodiment comprising a stand alone printer device. The receiving device comprises a communications port 701 for communicating with a remote server; a print mechanism 702 that is known in the art, for applying ink to a print media; a data processor 703; an amount of memory 704; a data storage device 705, for example a hard disk drive or the like; a user interface 706; a print application software 707 or print firmware 707 for processing print jobs received from a remote source and for passing the print jobs through the print mechanism 702 to obtain printed images on a print media; and a registration application 708 for allowing the receiving device to register with a further computer, providing a service of automatically routing print jobs to a receiving device specified by a user.

The receiving device 700 may comprise a stand alone printer device combined with a personal computer, a Macintosh®, computer or the like, having a communications port 701; a printer mechanism 702; a processor 703; a memory 704; a data storage device 705, for example a hard disk; a user interface 706, such as a conventional video monitor user interface with keyboard and mouse, or may comprise a stand alone printer device having a printer mechanism, and a user interface, with the capability for loading a registration application into a memory or data storage device comprising the stand alone printer; a print program or firmware module 707 for effecting printing; and a registration application 708 for registering the receiving device with a remote printing server.

Figure 8:
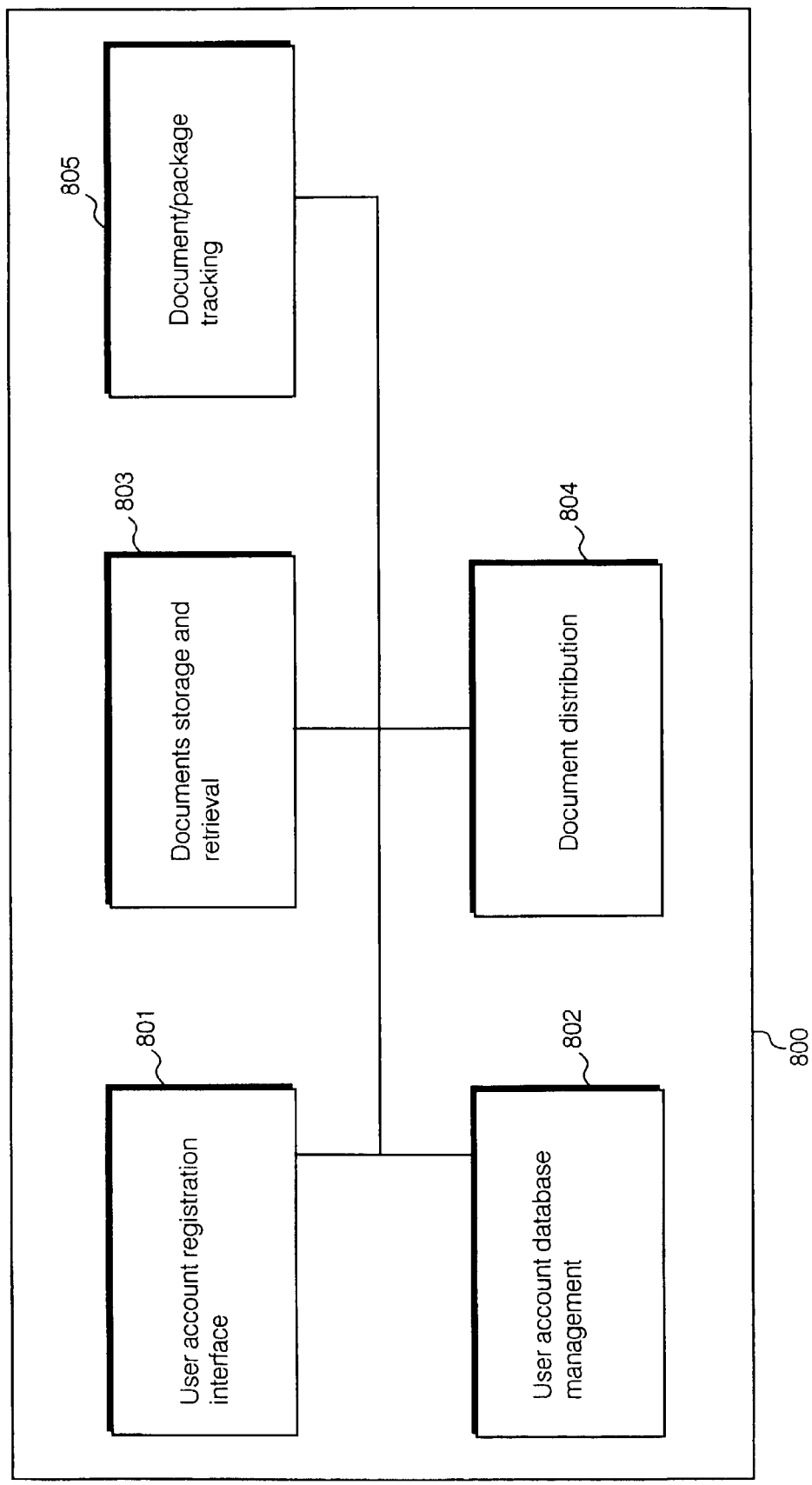
FIG. 8 illustrates schematically components of a server computer program for providing a remote printing service.

Referring to FIG. 8 herein, there is illustration schematically components of the routing and registration application and the document distribution application resident at the server computer. These components may be supplied as a computer program loaded into a server computer, either electronically as a download, or through a port, for example a CD ROM port, where the computer program is carried on a data storage media, for example a CD ROM or the like. The components include a user registration interface driver 801; a user account database management component 802 a document storage and retrieval component 803 for storing incoming documents and retrieving those documents in response to requests from a receiving device for delivery of documents; a document distribution component 804 for distributing and routing documents for delivery at receiving devices and subsequent printing at specified printer devices; and a document package tracking module for tracking packages sent in the system.

Figure 9:
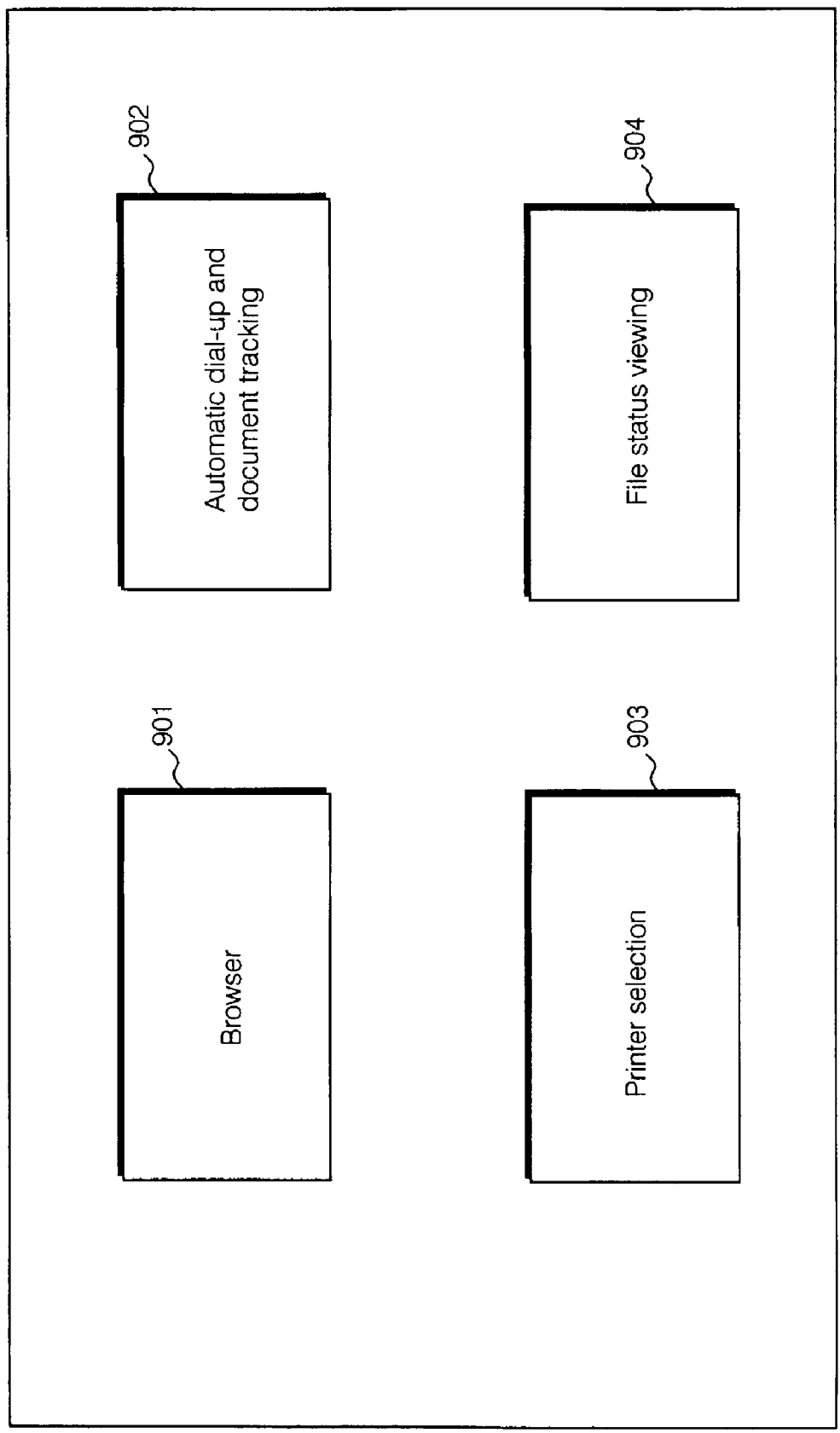
FIG. 9 illustrates schematically components of a receiving device computer program for enabling a receiving device to register with a remote printing service and to receive documents for printing.

Referring to FIG. 9 herein, there is illustration schematically components of client computer program application resident on a receiving device. The application 900 comprises a browser 901, for example a conventional browser such as a Netscape®; an automatic dial up and document checking component 902 for automatically dialing up and interrogating a server computer with which the receiving device is registered; a printer selection component 903 for selecting a printer on which to print downloaded document files; and a file status viewing component 904 for viewing a status of individual document and file of a user.

The following describes messages exchanged between the e-receiver and the remote printing server to carry out two different types of operation:

Registering the e-receiver so that it can start to receive jobs from the service;
Processing jobs from the service.

E-Receiver and Printer Registration Messages

Figure 10:
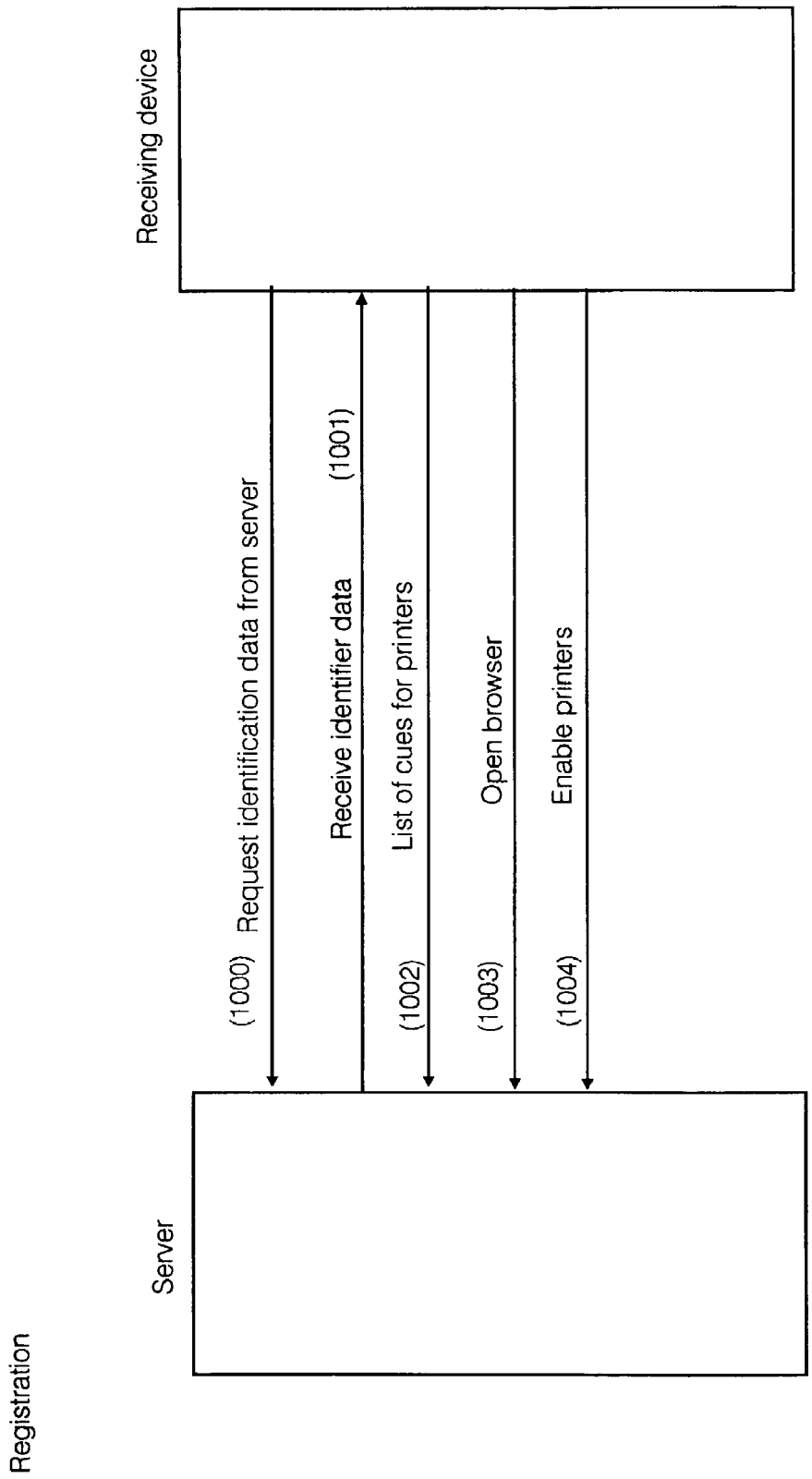
FIG. 10 illustrates schematically communications between a server hosting a remote printing service and a receiving device for registration of the receving device with the remote printing service.

Referring to FIG. 10 herein, there is illustration schematically communication between a server and a receiving device for registering the receiving device so that it can start to receive jobs from the server.

The registration protocol is carried out in two steps. Firstly the e-receiver requests an identification data from the service in step 1000. The receiving device receives its unique identifier data from the server in step 1001. Secondly the e-receiver provides to the service a list of existing printing queues in steps 1002 and opens a browser web page in step 1003 which allows the user to enable one of those printers (1004).

Getting a Receiver Identification from the Service

The receiving device receives an identifier from the server device in step 1004.

Figure 11:
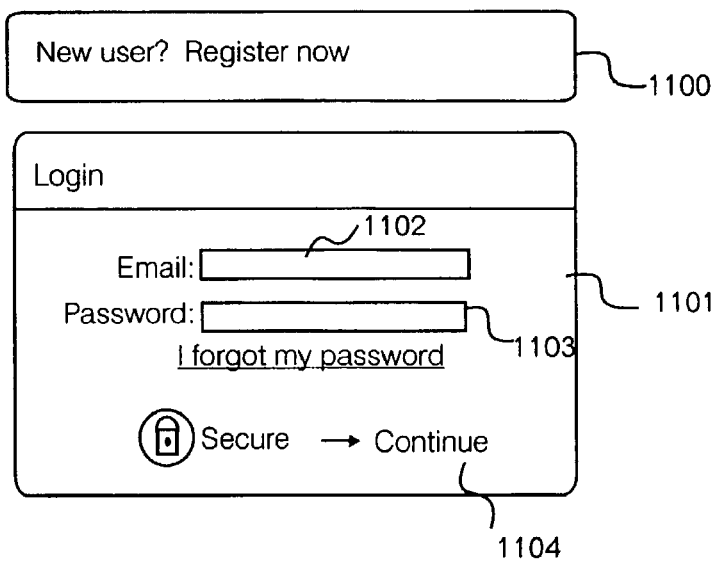
FIG. 11 illustrates schematically a first interface display screen presented as part of a registration process of a receiving device with a remote printing service hosted by a server computer.

This process will be carried out the first time the e-receiver software gains access to the service. The following commands are sent:

Referring to FIG. 11 herein, there is illustration schematically a first user interface for registering a receiving device with a remote server, to set up the receiving device for receiving documents for a user.

A user identifies the server using a known browser device, and accesses a remote printing service, for example at a website; http//www.hp.com/go/remoteprinting/aec. The interface comprises a 'register now' icon 1100 and a login data box 1101. The login data box 1101 comprises an e-mail address text box 1102, for entering an e-mail address of a user, and a password entry text box 1103 for entry of a user password.

The user activates a 'continue' icon 1104 to continue to a next interface, to continue a registration process.

Figure 12:
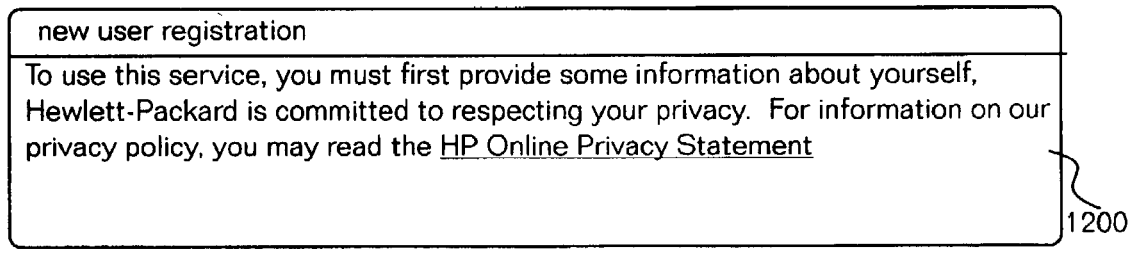
FIG. 12 illustrates schematically a second interface display screen presented during the registration process of the receiving device.

Referring to FIG. 12 herein, there is illustration schematically a second user interface screen viewable at the receiving device for registering a new user with the service. The second screen comprises a service agreement screen 1200 and a data entry screen 1201.

The service agreement screen 1200 comprises a link 1201 to a service contract agreement in the form of viewable text, which can be accesses by a user selecting the link using an icon and pointing device, for example a mouse. Upon activation of the link, the text of the service agreement is viewable via the web browser, and displayed by the server computer.

A user inputs their e-mail address, password and password confirmation in a corresponding respective e-mail address data entry box 1202, password data entry box 1203 and password confirmation entry box 1204.

At the sever, the e-mail and password are stored as a user account data.

Figure 13:
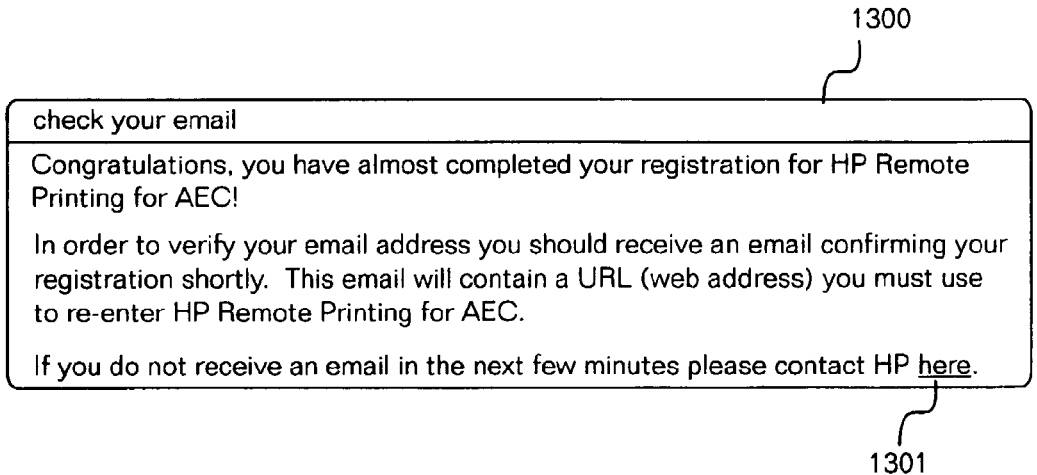
FIG. 13 illustrates schematically a third interface display screen presented as part of the registration process of the receiving device.

Referring to FIG. 13 herein, there is illustration schematically a third interface screen viewable at the receiving device during the registration process. The third screen comprises a text message informing a user of a process. After submitting the registration, the user receives, at the receiving device an e-mail message confirming registration. The message contains a URL (web address) which needs to be selected by the user, using a pointer device and screen icon, to confirm the registration to the remote printing and document distribution services provided at the server device.

There is also a help icon 1301 which can be activated by the user to interrogate the server, in case the e-mail is not received by the received device.

Figure 14:
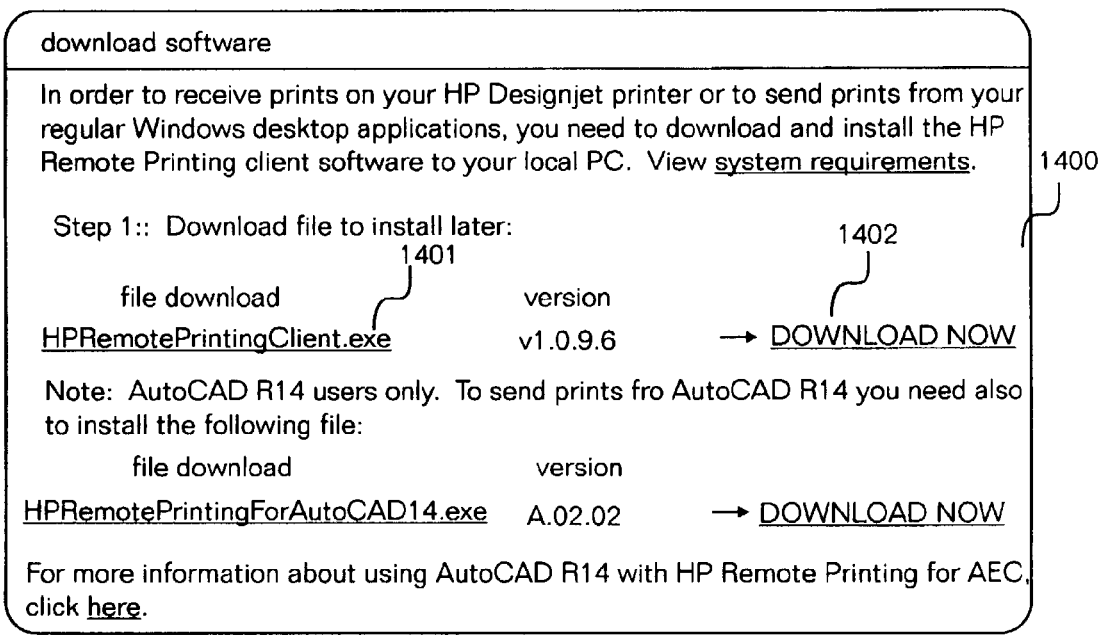
FIG. 14 illustrates schematically a fourth interface display screen presented as part of the registration process for registering a receiving device for downloading a control program to the receiving device.

Referring to FIG. 14 herein, there is illustration schematically a fourth interface screen viewable at the receiving device during the registration process of a receiving device and user with the server computer. The fourth screen 1400 comprises a web page from which client software can be downloaded and installed on the receiving device. Downloading the client software via the web page causes transfer of a client software program from the server to the receiving device, which is automatically installed upon the receiving device.

The fourth interface screen comprises text instructions for downloading a client software program, together with an icon, which, when activated sends an instruction to the server to send the client program to the receiving device. More than one executable client program may be downloaded from the server to the receiving device. In the example shown in FIG. 14, a first program hp remote printing client. exe can be downloaded, as well as a further program, hp remote printing for autocad r14.exe can be downloaded. The second client program enables customization of the receiving device to download documents generated by a specific application program, for example the known AutoCAD® application program.

The user installs the client software at the receiving device in order to proceed with the registration process.

Figure 15:
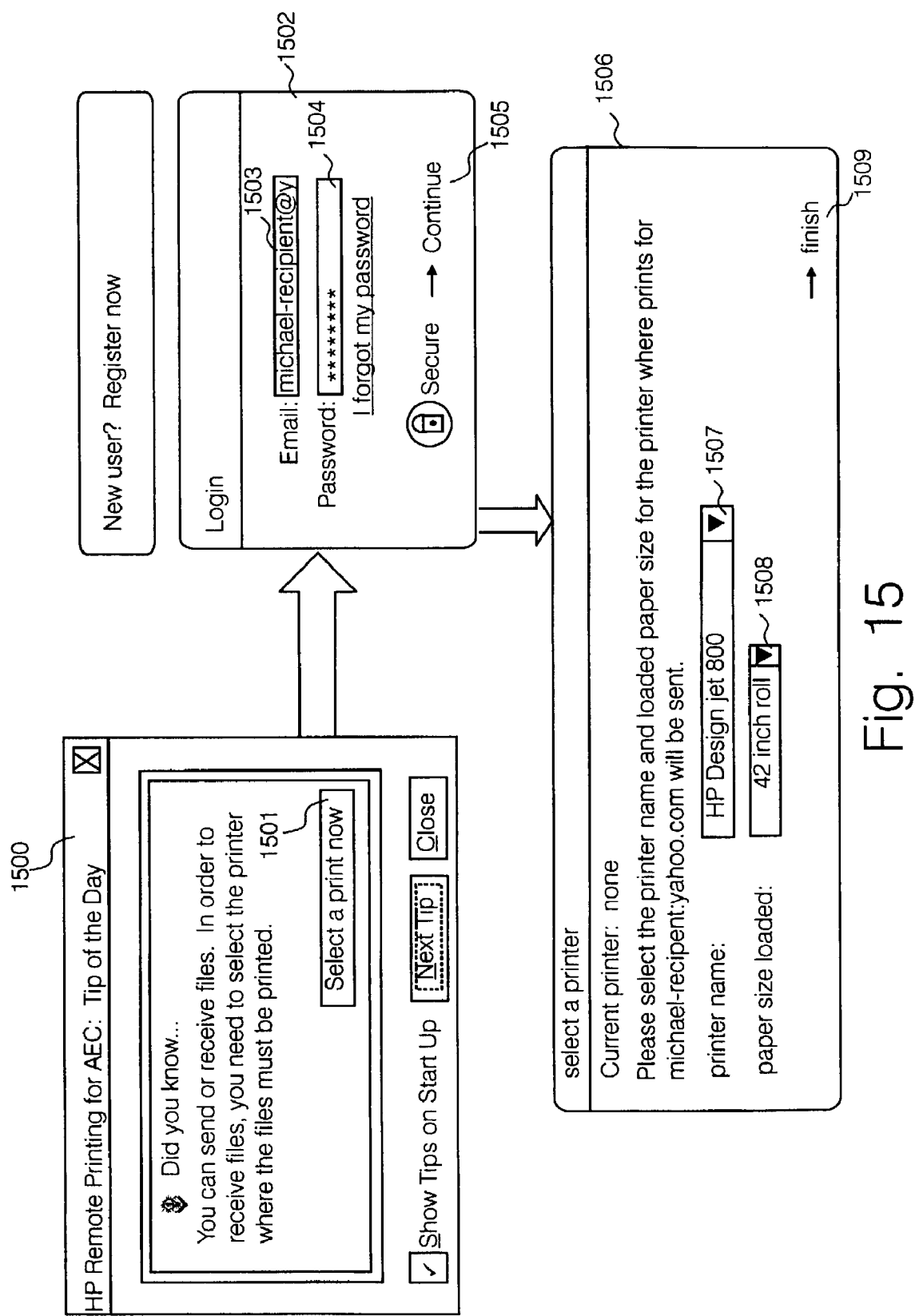
FIG. 15 illustrates schematically interface display screens displayed at a sending computer for registering a sending computer with a remote printing service hosted by a server computer.

Referring to FIG. 15 herein, there is illustration schematically screens displayed by a user interface generated by the client program installed on the receiving device. The screens comprise a 'tip' screen 1500, containing an icon 1501 for selecting a next screen to continue with a process of selecting a printer as part of the registration process. Activation of the select printer icon causes the receiving device to display in its browser a login screen display 1502 generated by the server. The login screen display comprises a text box 1503 for entering of an e-mail address of a user, and a password, text and entry box 1504. The login screen display also comprises a continue icon 1505, activation of which causes the receiving device to display a select printer screen display 1506.

The select printer screen display 1506 comprises text information, identifying an e-mail address of a user, which has been entered in the previously displayed login screen; a printer name drop down display 1507 identifying one or more printer devices associated with the receiving device; and a paper size loaded drop down display 1508 displaying one or more paper types or sized loaded onto a printer displayed in the printer name drop down menu.

By selecting the printer name drop down menu, a user can select a printer associated with the receiving device, and by selecting the paper size loaded drop down menu 1508, a user may select a particular paper size for printing on that printer. Where a printer is only capable of loading a single paper size, then the paper size loaded drop down display only displays a single paper size for a single printer. However, in a case where printers associated with the receiving device can print to one or more paper sizes, then one or more paper sizes may be displayed for that printer device.

The user selects the displayed printer and paper size by selecting a 'finish' icon 1509, comprising the printer select screen 1506.

At this stage, a user has registered their e-mail address from the server, the recipient device has received a unique identifier from the server, identifying the recipient device, the server has created a user account for the user, identified by the e-mail address, the user account specifying a particular receiving device, and printer to which documents are to be sent.

```
<?xml version="1.0" encoding="UTF-8"?>
<JMF SenderID="genericReceiver" DeviceID="" Version="0.1.1"
TimeStamp="now">
<Command ID="id-0" Type=HPCPIRegisterReceiver">
<DeviceParams
SoftwareVersion = " 1.0.5"
</DeviceParams>
<Command>
</JMF>
```

Note that the e-receiver identification in this case is not meaningful.

The response from the service will be as follows:

The response contains the following elements:

A unique identification that the software uses to register itself with the service.

The URL to which the e-receiver addresses requests for pending jobs.

The URL to which the e-receiver sends requests to register a printer.

The identification displayed in the example follows the convention of a windows graphical user interface device (GUID), but that is not a requirement. The identification length should be restricted. The maximum length suggested is 48 bytes, which will be enough to hold the ASCII representations of the Windows GUID, plus some additional header data.

Registering a Printer

A user launches a registration process from the e-receiver software. The e-receiver software carries out the registration in two steps.

Firstly, it sends a list of pritners visible to the e-receiver to the service.

Secondly, a browser window is opened where the user can carry out a log-in.

```
<JMF SenderID=RECID-09898"
DeviceID="" Version="0.1.1" TimStamp="now">
<Command ID="id-0" Type="HPCPIRegisterPrinter">
<PrinterList
<PrinterParams
Name = " Don's Designjet"
Model = "HP DesignJet 5000 24 by HP" />
<PrinterParams
Name = "Department Printer"
Model = "HP Laserjet 4050 Series PCL5e" />
</PrinterList>
</Command>
</JMF>
```

The response contains the URL of the web page where the user can select the new printer:

```
<?xml version="1.0" encoding="UTF-8"?>
<JMF SenderID="http://cpsdev.vcd.hp.com/printbig/JmfReceiver"
DeviceID="" Version="0.1.1" TimeStamp="now">
<Response Type="HPCPIRegisterReceiver" ID="id-0" >
<ReceiverParams
ID= " f5f0f890-0909-0404-0123456789AB"
    RequestURL    =    "http://cpsdev2.vcd.ho.com/printbig/service/com.hp.cp.rpp.
JmfRecevier"
    RegistrationURL   =   "http://cpsdev2.vcd.ho.com/printbig/service/com.hp.cp.rpp.
PrinterRegistration" />
    </command>
    </JMF>
```

```
<?xml version="1.0" encoding="UTF-8"?>
<JMF SenderID="http://cpsdev.vcd.hp.com/printbig/JmfReceiver"
DeviceID="" Version=0.1.1" TimeStamp="now">
  <Response Type="HPCPIRegisterPrinter" ID="id-0" >
  <RegisterPrinterParams
  RequestURL=
"http://cpsdev2.vcd.hp.com/printbig/servlet/com.hp.cp.rppJmfReceiver?sessionID-9879" />
  </Command>
  </JMF>
```

The service will have to keep the request for registration open for some time to give the user time to log-in and to register.

Processing Jobs from the Service

The e-receiver gets jobs from the service by sending requests to the request URL returned by the RegisterReceiver response.

Figure 16:
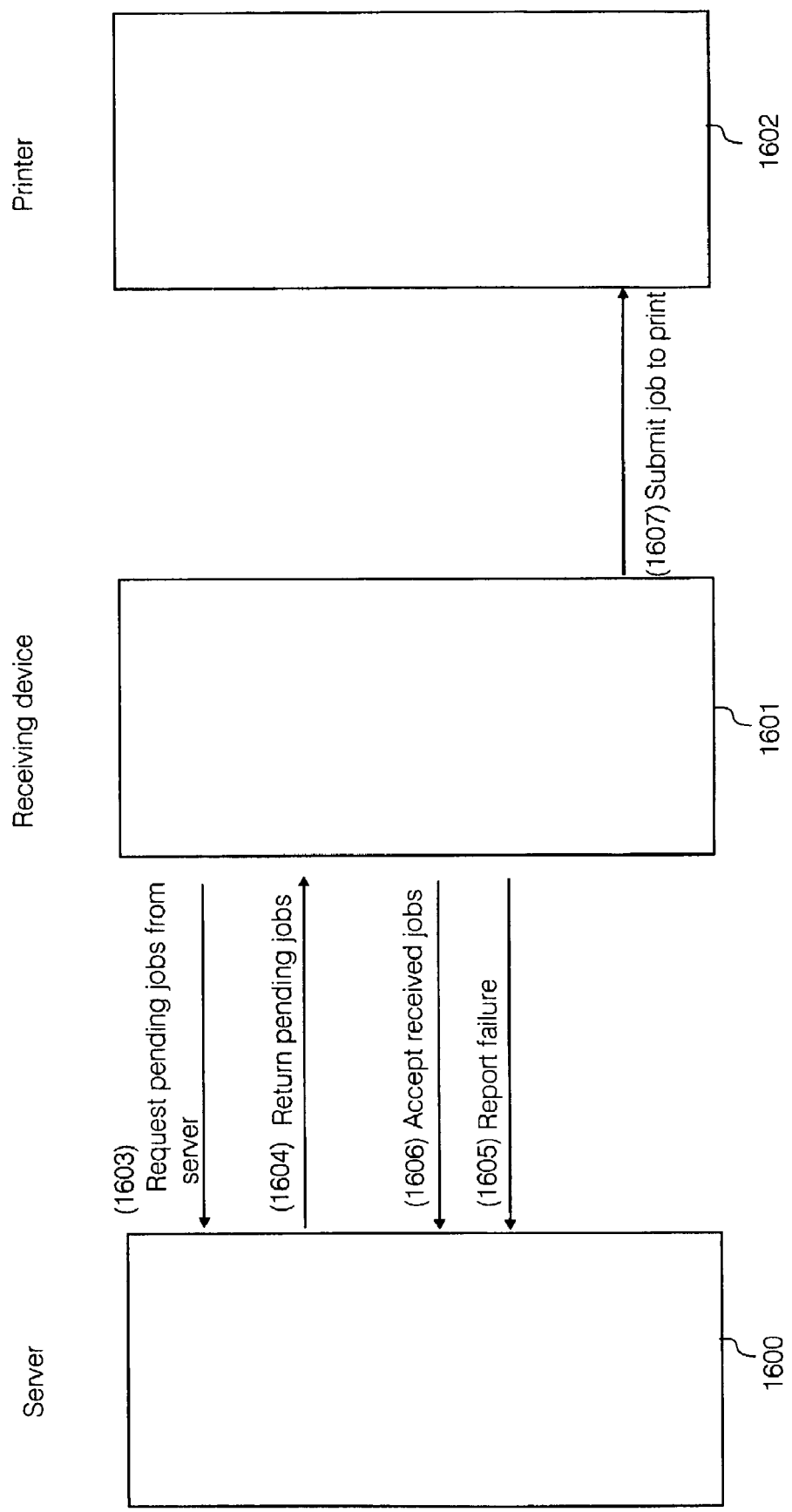
FIG. 16 illustrates schematically messages communicated between a server computer, a receiving device, and a printer for receiving documents from a remote printing service and printing documents to a specified printer device.

Referring to FIG. 16 herein, there is illustration schematically communications between the server computer 1600; receiving device 1601; and a printer 1602 associated with the receiving device for requesting documents and files from the server and printing out those documents or files.

Processing of jobs in the e-receiver is handled through the following steps.

The e-receiver sends a command requesting pending jobs in step 1603.

The service returns pending jobs, if any are pending instep 1604.

The e-receiver sends a response either accepting the job or reporting the failure. The e-receiver carries out any processing involved with the job.

If the job has failed, so that it could not be completed, the e-receiver sends a response reporting the failure in step 1605. If the job has been processed successfully, the e-receiver sends a response accepting the job in step 1606, and sends to the printer a command to submit the job for printing, in step 1607. After the job has been submitted, the e-receiver will generate a new notification message, indicating either success or failure, and sends this message to the server.

Figure 17:
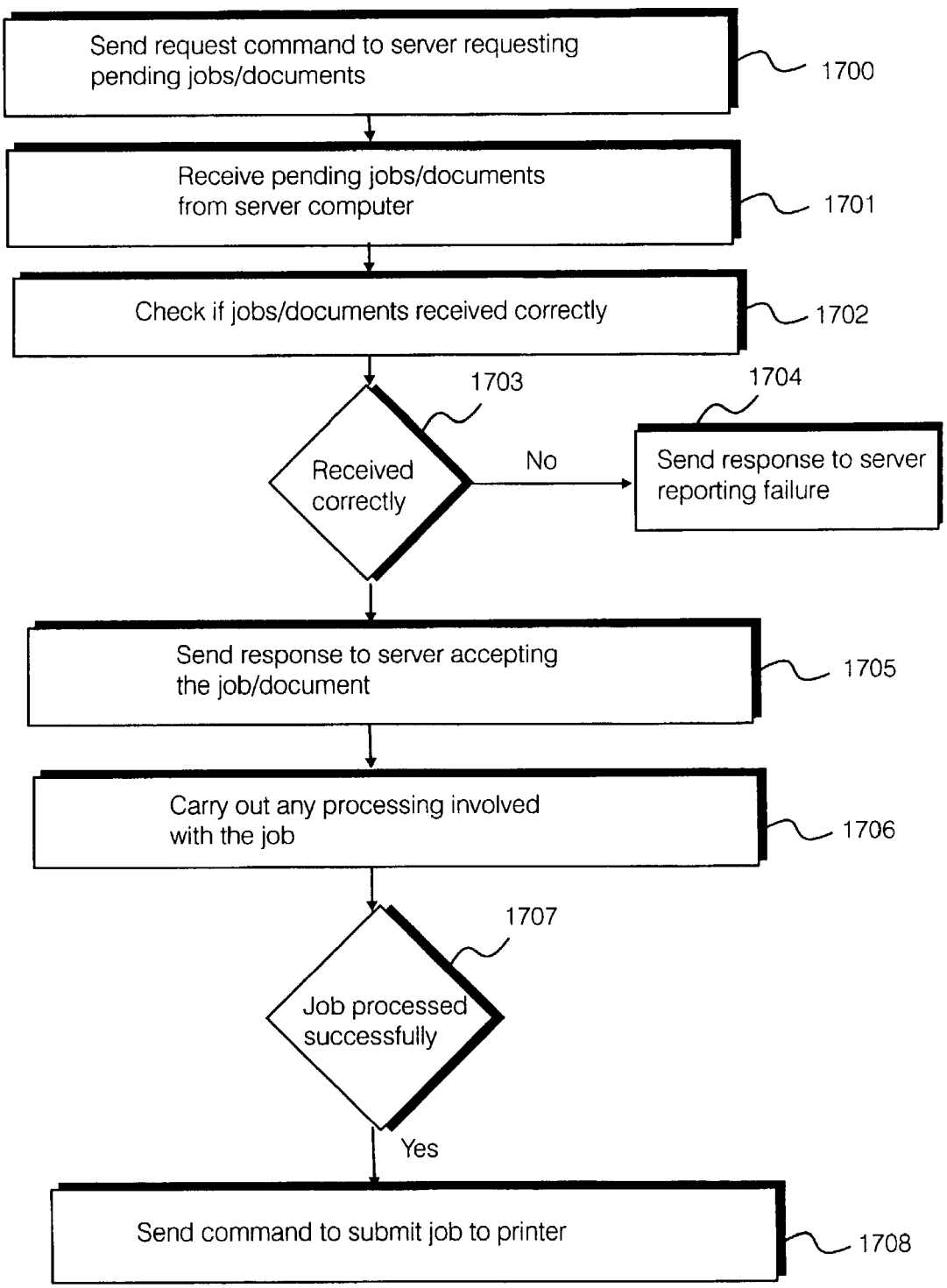
FIG. 17 illustrates schematically a flow chart of process steps carried out by a receiving device for processing a package comprising at least one print job, received from a remote printing service hosted by a server device.

Referring to FIG. 17 herein, there is illustration schematically steps carried out by the receiver device for processing jobs from the server. In step 1700, the receiving device sends a request command to the server requesting an pending documents, files or print jobs. In step 1701, the receiving device receives any pending documents, files or print jobs from the server computer. In step 1702, the server checks if the jobs have been received correctly. If, in step 1703, the receiving device determines that the print jobs have not been correctly received then in step 1704 the receiving device sends a response to the server, reporting a failure to receive the print jobs.

However, if in step 1703, one or more print jobs are correctly received, then in step 1705 the receiving device sends a response to the server accepting the print job, including any documents or files. In step 1706 the receiving device carries out any processing involved with the print job and in step 1707 sends a command to submit the print job to a printer specified previously in the registration process for printing the print job.

Figure 18:
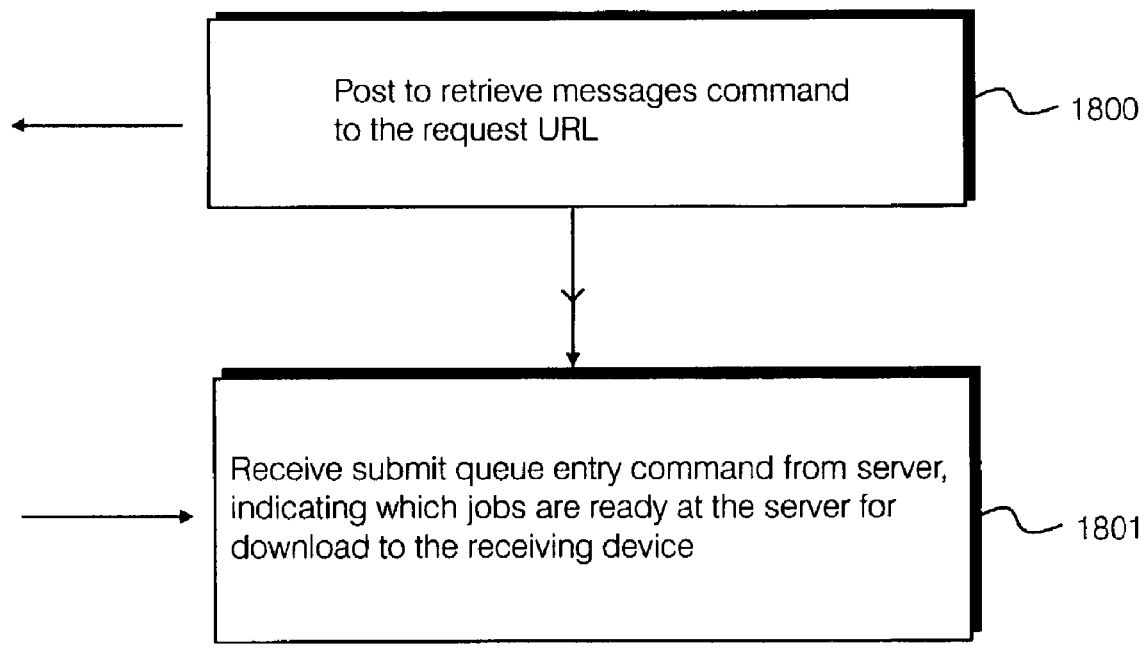
FIG. 18 illustrates schematically messages sent and received by a receiving device for retrieving a package from a remote printing service.

Referring to FIG. 18 herein, there is illustration schematically message received and send steps carried out by the receiving device. In step 1800, the receiving device posts a retrieve messages command to the request url at the sever.

In step 1801, the receiving device receives a submit q entry command from the server, indicating which jobs are ready at the server for download to the receiving device.

Figure 19:
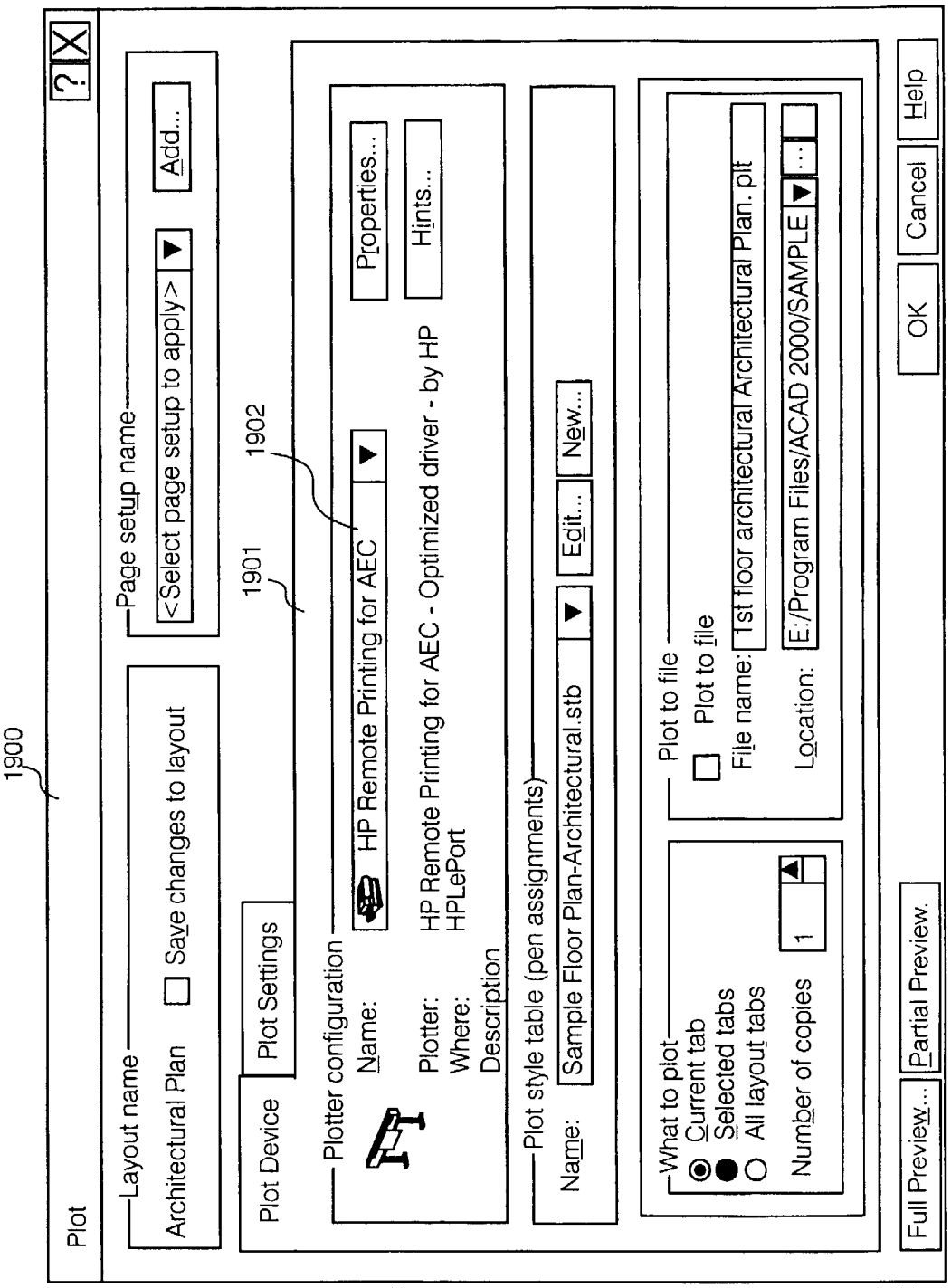
FIG. 19 illustrates schematically an interface display screen of a graphics application, illustrating selection of a remote printing service as a print option.

Referring to FIG. 19 herein, there is illustrated a display screen generated at a sending computer for sending a document for printing at a remote device.

In a print application, being a source of a document to be printed, for example AutoCAD®, or another document generating application capable of generating a document to be printed, a known print menu is activated 1900. The known printing display comprises a page 1901 for selecting a printer device. Within a menu of available printer devices, the remote printing service provided by the server, plurality of receiving devices, and printers appears as an option 2002 selecting the remote printing service option from the list of printers causes a remote printing sender window to appear.

Figure 20:
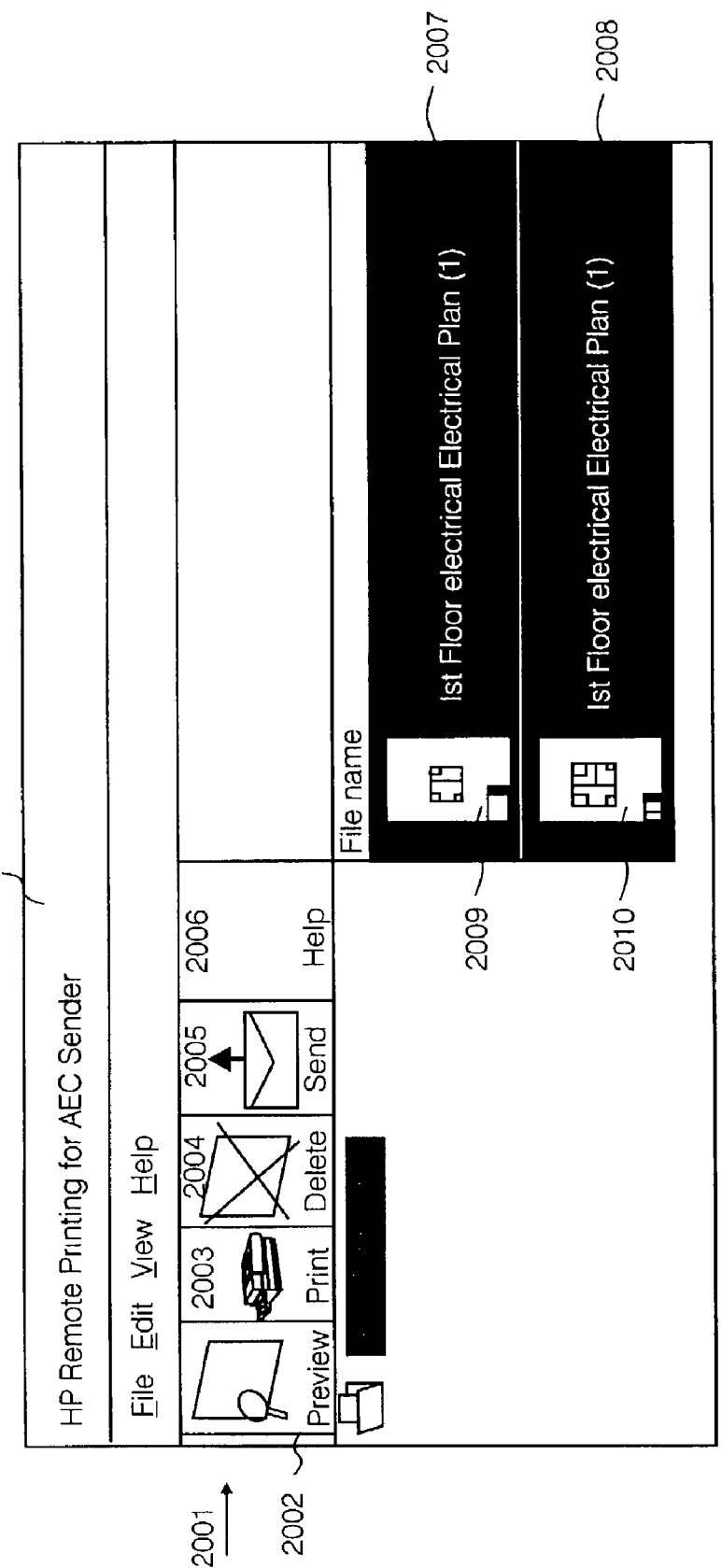
FIG. 20 illustrates schematically an interface display screen generated by a sender computer, for collecting one or more image files ready for sending for a server computer hosting a remote printing service.

Referring to FIG. 20 herein, there is illustration schematically a remote printer sender window generated by selected a remote printer service from a printer selection list in a conventional document generating application.

The remote printing sender window 2000 comprises a tool bar 2001 having a 'preview' icon 2002, a 'print' icon 2003, a 'delete' icon 2004, a 'send' icon 2005 and a 'help' icon 2006; and a file display area for displaying one or more files available for sending to a remote printing service provided by the server, receiving devices and printer devices, and a list of file names 2007, 2008 of the files ready to be sent, each file being identified by a file name and a thumbnail image 2009, 2010, allowing a user to readily identify a document by the thumbnail image, and a file name.

When the use is ready to send a file, the use selects the file by an icon and pointing device over the file name and/or thumbnail, and activating the 'send'.

The user can arrange the files within the remote printing display screen by deleting files using the delete icon 2004.

Figure 21:
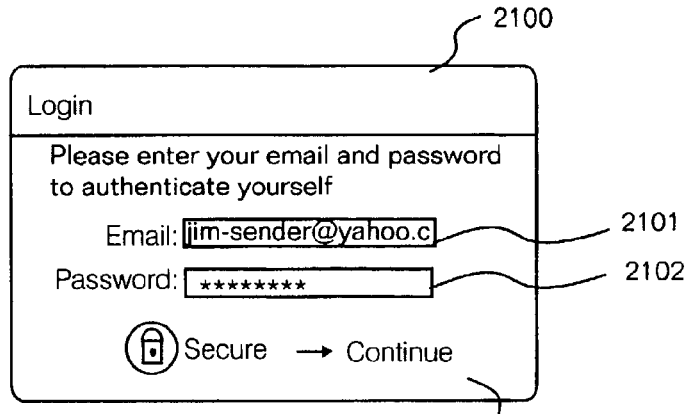
FIG. 21 illustrates schematically a login interface display screen for logging in a sending computer to a remote printing service hosted by a remote server.

Referring to FIG. 21 herein, there is illustration schematically an interface display generated by the server, and displayed at the sending device, for collecting login data of the user including e-mail address and password. The screen display comprises an e-mail text collecting box 2101 and a password text entry box 2102.

Within a user session, the first time that a user sends files to the remote printing service, there appears a login display as illustrated in FIG. 21, at the sender device. The remote printing service requires identification of the sender, which includes the e-mail address and password which were previously provided on registration.

Figure 22:
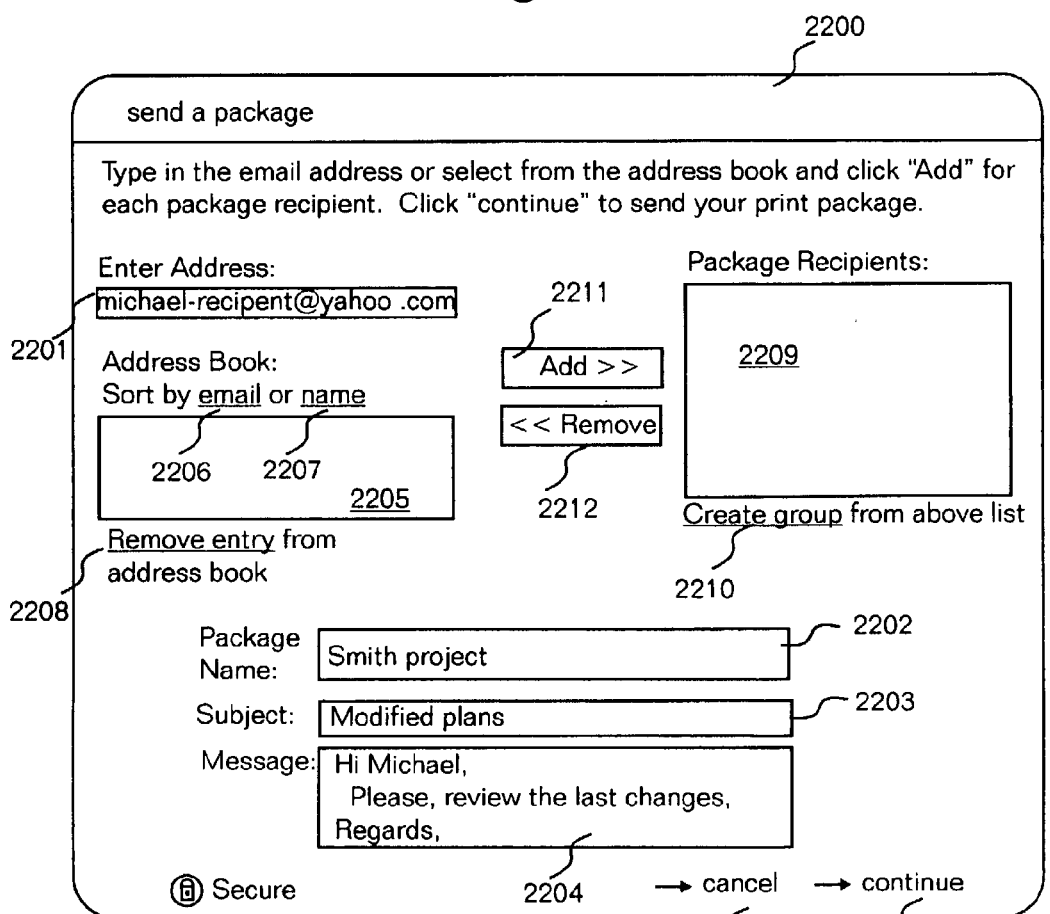
FIG. 22 illustrates schematically a display interface screen generated by a remote server computer, and viewable via a web browser hosted by a sender computer, for sending a package comprising one or more files or documents to be printed to a remote printing service.

Referring to FIG. 22 herein, there is illustration schematically a web page generated by the server which appears for viewing in a web browser window of a web browser installed on the sender computer, prior to uploading of document files from the sender computer to the server.

The screen view 2200 comprises am e-mail entry text box 2301 for entering an e-mail address of a recipient of the document; a package name text entry box 2202 for applying a text name to a document to be delivered; a subject text window 2203 for entering text data describing a subject of a package is to be sent; a message data entry box 2204 for adding a personalized message to the package to be sent; an address box list window 2202, for storing e-mail address of recipient persons to whom the package may be sent, the address book comprising a list of e-mail addresses or names, which can be sorted either by e-mail address or by name alphabetically, and having a remove entry facility 2208 for sorting recipient names or e-mails; a package recipient send display window 2209 for listing 1 or more recipient e-mail addresses or names to which a package is to be sent; a create a group icon 2210 for creating a group of recipients displayed in the package recipient window, which can be referred to at a later data for sending documents to the same group of recipients; an add address icon 2211 for adding an address to the package recipient window or to a group; and a remove icon 2212 for removing an address or a recipient from a list of recipients in the package recipient window, or group or recipients in the package recipient window. Or for simply removing a single recipient from the package recipient window.

The user can fill in e-mail address for intended recipients of a document package and can use the address book window to store the commonly used address.

The package sending window 2200 also comprises a cancel icon 2213 for canceling the window and canceling sending of the package, and a continue icon 2214 for activateable continuing with the process of sending a package to the remote printing and distribution service and distribution and printing.

Referring to FIG. 23 herein, there is illustration schematically a package display interface which is accessible by a user by tracking packages already sent to one or more recipients.

The interface display comprises a list of recipients, identifying a package name sent to the recipient, a number of files comparing the package, a date the package was sent, and a status of the package, i.e. whether
confirming the status as either 'sent' or 'waiting'. The tracking window also comprises a command icon 2301 activated for forwarding a selected package, and a further command icon 2302 for deleting a selected package from the server.

The package tracking display displays a list of recipients, detailing for each recipient a package name, number of files, date sent and status.

Referring to FIG. 24 herein, there is illustrated one example of an e-mail notification which is received as default by a sender whenever a file which the sender has sent is printed by a recipient. The notification is automatically sent by the server to the sending device whenever a package or file sent to a recipient is printed. This enables the sender to obtain confirmation that a document has been received and printed by a recipient.

Automatic sending of e-mail notifications from the server to the sender computer can be turned off by a user accessing a change configuration section of the service provided by the server, in which the sender can configure the printing and distribution service to their own requirements, in particular specifying whether or not e-mail notification are generated automatically whenever a recipient prints a package intended for them.

The e-mail notification comprises a date field 2400; a source field 2401 identifying the server computer from which the notification originated; a destination field 2402 indicating an e-mail address to whom the e-mail is intended for; a subject field 2403 identifying a subject of the e-mail, a notification that a particular file has been sent to a receivers printer; a link 2404 to a web address at which the sender can check a status of the package sent, and package detail data including a senders e-mail, a receiver e-mail address, a data package was sent, a subject matter of the package, a name of the package, and a unique identifier data identifying the package.

The e-mail also comprises a file identifier section 2406 identifying one or more individual files of the package each with a unique identifier number, and a file name for each package.

Referring to FIG. 25 herein, there is illustrated schematically an e-mail notification sent from the remote printing service to a recipient device whenever a package has been sent from the sender device and has been received by the remote printing service.

The notification e-mail comprises a data and time field 2500; a field 2501 identifying the server device sending the messages; a recipient e-mail address field 2502 identifying the e-mail address of the intended recipient; a subject field 2503 containing an e-mail address of the sender of the package and containing a link to the remote printing service for accepting or deleting the package; a package details field 2604 describing the package, including an e-mail of the sender, an e-mail address of the intended recipient, a data at which the package was received, a subject text name of the package, a package name of the package, an identification number of the package, and information containing how many files the package contains; and a file list specifying for each file contained in the package a file identifier data a file name.

Figure 26:
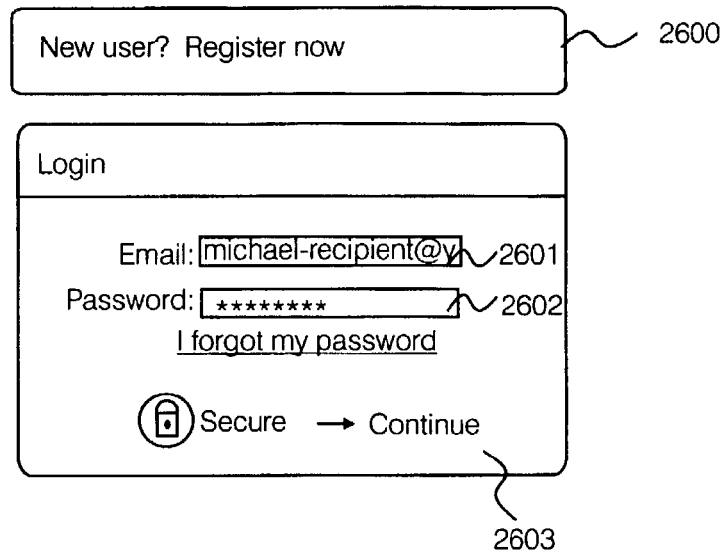
FIG. 26 illustrates schematically a display interface screen for logging in a receiving device already registered with a remote printing service, at the start of a session for collection of packages containing files to be printed.

Referring to FIG. 26 herein, there is illustrated schematically a login display interface presented to a user for receiving packages. The login display is presented the first time in a session that a user attempts to login to the printing service to receive packages. The interface display comprises an e-mail text window 2601 for entry of a recipients e-mail address; and a password text window 2602 for entry of a password. There is also a continue icon 2603 in order to continue to a next display screen.

An person may log into the system in a receiver session by giving the e-mail address and password which has been previously provided upon registration of a user and receiving device.

Figure 27:
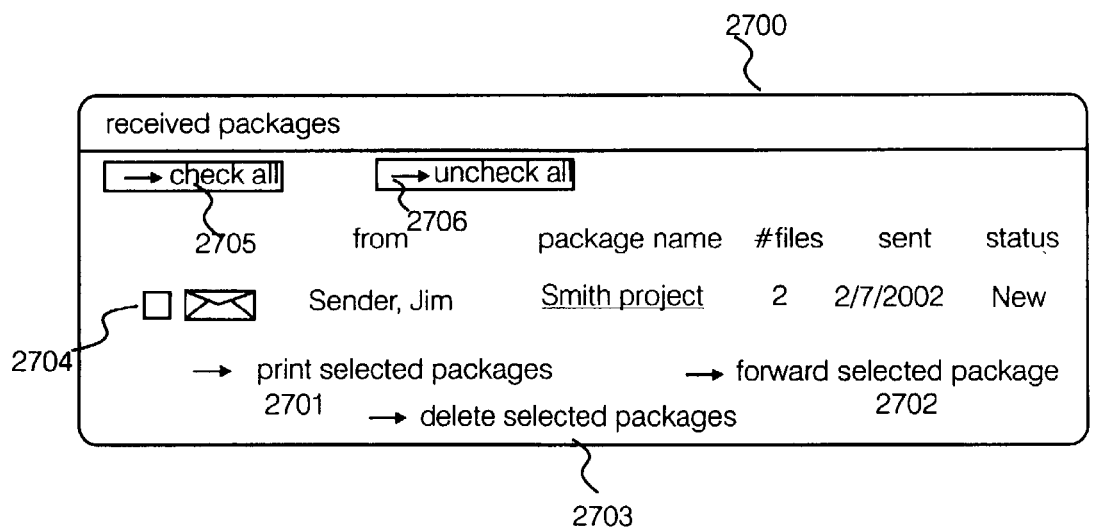
FIG. 27 illustrates schematically a display interface screen listing a plurality of packages ready for collection at a remote printing service.

Referring to FIG. 27 herein, there is illustrated schematically an interface display screen accessible for display at a receiving device after login by the receiving device to the printing service. The packages display screen 2700 comprises a list of a packages, detailing for each package a sender name, a package name, a number of files in the package, a date the package was received by the document service, and a status of the package that is whether it is 'new' indicating newly received.

The display screen also comprises a command icon for printing a selected package, a command icon 2702 for forwarding a selected package to a selected destination; and a delete command icon 2703 for deleting a selected package.

A package may be selected by checking a tick box 2704. A plurality of tick boxes in one operation by activating a check all icon 2705. Similar, all check boxes may be unchecked at once by activating an uncheck all command icon 2706.

Referring to FIG. 28 herein, there is illustrated schematically, a package detail interface display screen accessible activating the print selected packages command icon 2801.

The package details display screen 2800 comprises a source display 2801 detailing a name of a sender; a time received display 2802 detailing a time at which a package was received by the service; an expiry time display 2803 detailing a time and date at which the packet expires; a package identification section comprising a package name text date, subject text data, a message section 2806; and a package identification data 2907; and a list of files, each identified by a file identification number, a file name, a file memory size, a print size of a document contained within a file, a status of the file, and a thumbnail image 2808 showing in miniature context of the file. Each file entry has a tick check box 2808 for selection of the file entry. The interface comprises a text entry window 2810 for entering a number of copies of the file to be printed, and a command icon 2811 for printing a selected file, a command icon 2812 for deleting a package; a command icon 2813 for forwarding a selecting file to a destination, and a command icon 2814 for proceeding.

The content of any package can be inspected once the package has been received by clicking on the package name on the received packages page in the previous step. On the package details page, some or any of the file in the package can be selected for print.

Figure 29:
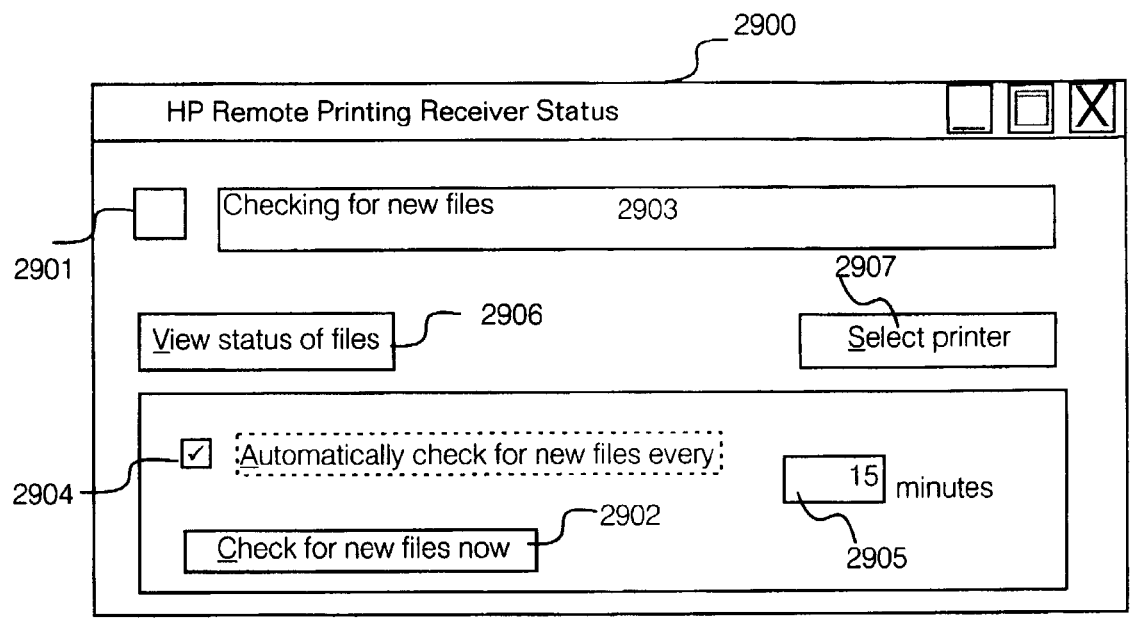
FIG. 29 illustrates schematically a display interface screen for instructing printing of a file or document available for collection at a remote server hosting a remote printing service, and for viewing a status of files ready for collection.

Referring to FIG. 29 herein, there is illustrated schematically an interface screen display viewable at a receiving device which is accessible to change the frequency with which the receiver device will download and print newly arrived packages from the server. The screen 2900 comprises a printing icon 2901, activation of which commands the server to immediately download and print a file, in conjunction with activation of an icon 2902 for checking for new files now. The display also comprises a monitor window 2903 which displays a message indicating action being taken by the remote server, for example, the action of checking for new files for the recipient.

The display comprises a check box 2904 which can be checked to automatically check for new files at a predetermined period. The pre-determined period can be entered into a period entry text box 2905.

For example, a recipient wishing to check for new files every 15 minutes, can tick the check box 290 to automatically check for new files, and enter the text data in the text data entry box 2905

The screen further comprises a view status of files icon 2906 for viewing the status of file intended for the recipient, and a select printer icon 2907 for selecting a printer for printing of the files.

E-Receiver Requests Jobs from the Service

The e-receiver posts the following command to the request URL. The URL was returned in the HPCPIRegisterReceiver command.

```
<?xml version="1.0"
encoding="UTF-8"?><JMF SenderID="2303022393334343"
DeviceID=""
Version="0_2" TimeStamp="2001-08-27"><Command ID=id-0"
Type="HPCPIRetrieveMessages"><RetrieveMessagesParams
HPCPIMaxMessages="1"/>
</Command></JMF>
```

Relevant parameters include

SenderID: this must be the e-receiver's unique ID.

MaxMessages: the maximum number of job tickets which can be returned in the response. In the best mode implementation, the e-receiver returns one job ticket at a time, although in other implementations a plurality of job tickets can be returned by the e-receiver at any one time.

3.2 Service Returns Jobs

To the RetrieveMessages command, the service returns a SubmitQueueEntry command.

```
<?xml version="1.0" encoding="UTF-8"?>
<JMF
SenderID="http://cpsdev2.vcd.hp.com/techprint/RppReceiver"
DeviceID="203022393334343"
Version="0_2" TimeStamp="2001-08-27">
<Command ID=id-0" Type="SubmitQueueEntry">
<QueueSubmissionParams
ReturnURL="http://cpsdev2.vcd.hp.com/techprint/RppReceiver"
QueueEntryID="455">
<HPCPIJdf>
<JDF ID="455" Status="new"" Type="SendToPrinter"
DescriptiveName+"Files to print"></JDF>
<HPCPIJdf>
</QueueSubmissionParams></Command></JMF>
```

The fields in this command are:

Sender ID: an identifier for the service which is sending the command.

Device ID: the identification of the e-receiver.

Return URL: this is an optional command. If provided, future responses and commands related to this job have to be addressed to this URL. If the return URL is not provided, it is assumed the same URL which returned the QueueSubmissionParams command.

Queue entry ID: the unique job ID for the job.

HPCPIJdf element: contains the application specific job ticket, which is a JDF structure.

If there are no jobs ready to download, the QueueSubmissionParams element is empty.

```
<?xml version="1.0" encoding="UTF-8"?>
<JMF
SenderID="http://cpsdev2.vcd.hp.com/techprint/RppReceiver"
DeviceID="203022393334343"
Version="0_2" TimeStamp="2001-08-27">
<Command ID=id-0" Type="SubmitQueueEntry">
<QueueSubmissionParams/>
</Command></JMF>
```

The e-receiver accepts a job

After the e-receiver has received a job, it checks whether the job can be successfully executed, and returns a response indicating whether the job has been accepted or not.

```
<?xml version="1.0" encoding="UTF-8"?>
<JMF SenderID=" 203022393334343"
DeviceID="http://cpsdev2.vcd.hp.com/techprint/RppReceiver"
Version="0_2" TimeStamp="2001-08-27">
<?xml version="1.0" encoding="UTF-8"?>
<JMF SenderID="203022393334343"
DeviceID="http://cpsdev2.vcd.hp.com/techprint/RppReceiver"
<Response ID="id-1"
Type="SubmitQueueEntry" refID="id-0" ReturnCode="105">
<Queue>
<QueueEntry QueueEntryID="455" Status="aborted" />
</Queue>
<HPCPIJdf>
<JDF> This is where the ticket goes!!</JDF>
</HPCPIJdf>
</Reponse>
</JMF>
```

The contents of this response is the same as the same as the SubmitQueueEntry response mentioned previously, plus a job ticket.

The invention claimed is:

1. A system for delivering files to a plurality of users over a communications network, said system comprising:
at least one server computer, said server computer being operable to receive and store a plurality of electronic documents;
a plurality of receiving devices capable of receiving said documents; and
a plurality of printer devices capable of printing said documents; and wherein:
each said receiving device has assigned to it at least one said printer device;
each said receiving device is registered with said server computer, said receiving device being identified by a unique identifier data stored by said server computer; and
said server computer comprises:
means for asking a particular individual receiver user to accept or reject a particular printing job, and for receiving a response indicating acceptance or rejection of the job,
means for allocating documents for a particular individual receiver user to a receiving device registered with the server computer for said particular receiver user, if the particular individual receiver user accepts an associated printing job, and
means for sending said documents to a said receiving device upon receipt of request data received by said server computer from said receiving device.

2. The system of claim 1, wherein:
the server computer is remote from the receiving devices and from the printer devices.

3. The system of claim 2, wherein:
the server computer is part of a business entity that is different from business entities of the receiving devices.

4. The system of claim 1, further comprising:
at least one sending device, said sending device being:
registered with said at least one server computer, and operable to send a said electronic document to said at least one server computer.

5. The system of claim 1, wherein:
said at least one server computer comprises a web interface; and
said web interface is operable to accept:
an e-mail address of a sender, and
a password for said sender.

6. The system of claim 1, wherein:
said at least one server computer operates to assign unique identifier data to each said receiving device.

7. The system of claim 1, wherein:
said at least one server computer operates to assign unique respective identifier data to at least one sending device.

8. The system of claim 1, wherein:
said at least one server computer maintains data describing:
a plurality of receiving devices, and
a plurality of users.

9. The system of claim 1, wherein:
a said receiving device operates to print jobs intended for a plurality of different users of the system.

10. The system of claim 1, wherein:
a user of said system may direct a document to a plurality of different said receiving users for printing; and
said at least one server computer maps said users to at least one said registered receiving device.

11. The system of claim 1, wherein:
a said receiving device obtains documents from said at least one server computer using a unique identifier, identifying said receiving device.

12. A method of operating a printing system that has at least one server computer which acts to route documents intended for a plurality of users; at least one receiving device which acts to receive documents sent from said server computer; and at least one printer device associated with said receiving device, for printing said documents; said method comprising the steps of:
registering a plurality of receiving devices at said server computer by creating a plurality of registration data entries which identify said plurality of receiving devices;
wherein each said registration data entry specifies at least one said printer device for printing a document addressed to a user;
said server sending an interrogation to a particular one of the receiving devices, to determine whether that receiving device will accept or reject a particular print job for printing;
said receiving device, or a human operator thereof, thereby having an option of either accepting or rejecting the job;
if the receiving device or operator accepts the job, then making the job available to the receiving device upon receipt of interrogations from the particular receiving device;
receiving interrogations from said plurality of receiving devices;
in response to said interrogations, causing said server computer to identify one or more documents intended for said receiving devices; and
sending said identified documents to said receiving devices.

13. The method of claim 12, wherein:
all the recited steps are performed by a server computer that is remote from each receiving device and from each printer device.

14. A method of operating a printing system that has at least one remote server computer acting to route documents intended for a plurality of users; at least one receiving device which acts to receive documents sent from said server computer; and at least one printer device associated with said receiving device for printing said documents; said method comprising the steps of:
sending a job to said remote printing server, using a sender computer, said sender specifying an address of a job receiver for which the print job is intended;
receiving, by a job receiver, an e-mail notification requesting the job receiver to confirm whether or not the job receiver accepts the print job;
accepting or rejecting, by the job receiver, said print job;
if the job receiver accepted said print job, then:
downloading said print job from said server computer to said receiving device; and
printing said print job.

15. The method of claim 14, further comprising the steps of:
said job sender receiving an e-mail notification from said remote server acknowledging the uploading of said print job from said sender computer to said print server computer; and said job receiver receiving an e-mail message describing said print job.

16. The method of claim 14, further comprising the step of:

said job receiver interrogating said remote print server, to inspect a list of print jobs intended for said receiver.

17. The method of claim 14, further comprising the step of:

said job sender interrogating said print server computer, to read a status of print jobs uploaded from said job sender to said remote print server.

18. A server computer comprising;

at least one data processing device;

at least one data storage device;

at least one remote communications interface; and a web server component, said web server component comprising means for:

accepting documents for printing via said communication interface;

generating a message indicating that a job is available for printing and inviting acceptance, by a remote receiver, of the printing job;

sending said message to a remote receiver via said remote communications interface;

whereby the receiver has an opportunity to accept or reject the job;

receiving an acceptance or rejection message for accepting a job to be printed; and if the message is an acceptance message, then:

responding to said acceptance message by sending said print job via said communications interface, generating a second message confirming that a job has been printed, and sending said second message via said communications interface.

* * * * *